(12) United States Patent
Gupta et al.

(10) Patent No.: US 9,785,699 B2
(45) Date of Patent: Oct. 10, 2017

(54) PHOTOGRAPH ORGANIZATION BASED ON FACIAL RECOGNITION

(71) Applicant: Adobe Systems Incorporated, San Jose, CA (US)

(72) Inventors: Angad Kumar Gupta, Ghaziabad (IN); Ram Prasad Purumala, Noida (IN); Nitish Singla, Mandi (IN); Alok Kumar Singh, Noida (IN)

(73) Assignee: Adobe Systems Incorporated, San Jose, CA (US)

(*) Notice: Subject to any disclaimer, the term of this patent is extended or adjusted under 35 U.S.C. 154(b) by 0 days.

(21) Appl. No.: 15/016,076

(22) Filed: Feb. 4, 2016

(65) Prior Publication Data

US 2017/0228453 A1   Aug. 10, 2017

(51) Int. Cl.
*G06K 9/00*   (2006.01)
*G06F 17/30*   (2006.01)
*G06K 9/62*   (2006.01)

(52) U.S. Cl.
CPC .... *G06F 17/30601* (2013.01); *G06F 17/3028* (2013.01); *G06F 17/30256* (2013.01); *G06F 17/30259* (2013.01); *G06K 9/00288* (2013.01); *G06K 9/6215* (2013.01); *G06K 9/6284* (2013.01)

(58) Field of Classification Search
None
See application file for complete search history.

(56) References Cited

U.S. PATENT DOCUMENTS

| | | | |
|---|---|---|---|
| 2009/0028393 A1* | 1/2009 | Kim | G06F 17/30247 382/118 |
| 2009/0252435 A1* | 10/2009 | Wen | G06K 9/00228 382/284 |
| 2010/0074540 A1* | 3/2010 | Tang | G06K 9/00677 382/225 |
| 2011/0099199 A1* | 4/2011 | Stalenhoef | G06F 17/3028 707/770 |
| 2011/0293188 A1* | 12/2011 | Zhang | G06K 9/00288 382/190 |

* cited by examiner

*Primary Examiner* — Sumati Lefkowitz
*Assistant Examiner* — David Perlman
(74) *Attorney, Agent, or Firm* — Wolfe-SBMC

(57) ABSTRACT

Photograph organization based on facial recognition is described. In one or more embodiments, a photograph organization module obtains multiple photographs having images of faces and recognizes the faces in the multiple photographs. The module builds a population by attempting to distinguish individual persons among the faces in the multiple photographs, with each person of the population corresponding to a group of multiple groups. After a first pass through the faces, the population includes a number of duplicative persons. With a second pass, the photograph organization module reduces the number of duplicative persons in the population by merging two or more groups of the multiple groups to produce a reduced number of groups. The merging is performed based on comparisons of the faces corresponding to the two or more groups. The multiple photographs are organized based on the reduced number of groups. Organization can include tagging or displaying grouped photographs.

20 Claims, 12 Drawing Sheets

PHOTOGRAPH ORGANIZATION BASED ON FACIAL RECOGNITION

BACKGROUND

It has been said that the best camera for taking a picture is the one that you have with you. Perhaps this notion explains why mobile phones have become the most common camera for taking casual pictures. Many people carry a smart phone with them at all times, so a camera is literally always at hand. Further, the quality of cameras on smart phones has been improved to the point that such cameras now rival compact point-and-shoot cameras from just a few years ago. Thus, the development of photography with smart phones has contributed to a dramatic increase in the number of photos that people take.

People also retain far more photos now than in decades past. Previously, when each photo cost money to develop and required a coveted spot in a photo album to store, both financial and space limitations discouraged people from taking and keeping too many photos. Now, however, photos may be stored in digital memory indefinitely at a cost that is negligible, if not free. Digital photography, which enables multiple photos of a single shot to be taken cheaply and instantly reviewed, also encourages people to produce many more photos than was feasible with analog cameras and physical film.

These factors work together to produce a positive result: people are better able to memorialize in photos those special memories that make life enjoyable. Unfortunately, there is also a downside. With so many factors encouraging the taking and keeping of digital photos, people quickly create photo collections that number in the hundreds and then thousands of photos. Such immense photo collections can be unwieldy and overwhelming. Finding specific photos of a particular person or event can be difficult and time consuming. Generally, organizing a photo collection in a manner that facilitates enjoying thousands of pictures is a daunting task.

And yet photographs can be better enjoyed if pictures are organized such that desired subjects and photographs can be surfaced for viewing by a user. Thankfully, photographs that are in a digital format, such as those that are scanned into a computer or those that are taken by a smart phone, are capable of being electronically organized. For example, digital photographs can be organized electronically by the date the photographs were taken, by a location at which the photographs were taken, by manually applied tags, and so forth. Additionally or alternatively, digital photographs can be organized by human subject based on facial recognition technologies and associated workflows.

A photograph-oriented computing application is capable of organizing photographs based on the persons that are depicted in the photographs using facial recognition. With facial recognition, selected facial features from a photographic image are compared to faces in a facial database. Based on the results of these comparisons, the computing application offers a user various options for viewing the photographs based on the persons depicted. For example, groups of photographs can be displayed in which each group has those photographs that include a particular person having been identified via facial recognition. A photograph application may display to a user, for instance, a first group of photographs having pictures that each include a spouse, a second group of photographs having pictures that each include a sister, and a third group of photographs having pictures that each include a son. Such photographic grouping enables the user to find photographs of a particular desired subject.

Unfortunately, conventional approaches to photographic grouping produce sub-optimal results. One problem is that conventional approaches produce multiple different photographic groups that correspond to a single person. In other words, a conventional approach can result in a first group of photographs, a second group of photographs, and a third group of photographs that are directed to pictures that each include the spouse of the user. When this problem is multiplied by, for instance, two dozen individual subjects that result in over a hundred photographic groups for just those two dozen people, the user's goal of organizing the entire photographic collection by depicted subject is severely hampered.

SUMMARY

Photograph organization based on facial recognition is described. With digital photography, people can easily collect thousands of photographs in a short period. A difficulty arises when trying to organize the photographs so that the photographs can be viewed and enjoyed. One approach to photograph organization relies on facial recognition to group photographs by persons that are depicted in the photographs. For example, a collection of thousands of photographs can be organized into two dozen groups by a computer program that distinguishes between persons "A" through "X" that are depicted in the thousands of photographs. Each respective group may include those photographs that have respective images of mom, dad, grandpa, sister, individual friends, a first cousin, and so forth. This approach provides a convenient filter with which to enjoy one's collection of photographs. Unfortunately, facial recognition technologies and associated workflows have limitations that can result in duplicate groups corresponding to a same person. For instance, a computer program may produce a first group for a person "C" and a second group for a person "K" even though both groups actually belong to a single person "C/K," such as a maternal grandmother.

In example implementations that are described herein, duplicative groups of faces that correspond to a same person are merged to simplify and expedite a photographic organization procedure for a user. Thus, the first group for the person "C" and the second group for the person "K" can be merged into one combined group corresponding to the maternal grandmother. A photographic organization procedure that is performed by a photograph organization module includes four phases and entails two passes over at least a portion of the photographs being organized. The first of the two passes includes the first, second, and third phases. The second pass includes the fourth phase.

In the first phase, a face detection module detects faces in multiple photographs. In the second phase, a face characterization module calculates facial representations of the faces detected in the multiple photographs. A face identification record (FIR), for instance, may be used as a facial representation. Two facial representations can be compared to one another to compute a similarity score that reflects how alike two faces are to each other. In the third phase, a face grouping module performs at least one grouping operation using similarity scores derived from the comparisons of the facial representations. The grouping operation includes assigning an individual face to a group of multiple groups if a corresponding similarity score qualifies as a strongest match. This matching may be dependent on a grouping threshold. Each group of the resulting multiple groups corresponds to a person that is identified as being part of a population of persons present in the multiple photographs.

As part of the third phase, the face grouping module additionally establishes group relationship indicators based on the at least one grouping operation. Each group relationship indicator links two or more groups that potentially comprise duplicative groups of a same person. If a face matches a particular group in accordance with a corresponding similarity score and the grouping threshold, but the particular group is not the strongest match, the face grouping module establishes a group relationship indicator between the particular group and the group to which the face is assigned. In a fourth phase, as part of a second pass across at least some of the faces of one or more of the photographs, a group merging module performs at least one merging operation to conditionally merge two or more groups that are linked by a group relationship indicator into a merged group that corresponds to the same person.

For each pair of groups linked by a group relationship indicator, the faces of one group are compared to the faces of the other group. If a sufficient number of faces in the one group are determined to match at least one face in the other group, then the two groups are deemed to correspond to a same person, and the group merging module combines the two groups into a merged group. This facial matching and the sufficient number may be dependent on a merging threshold and a simpatico threshold, respectively. The group merging reduces the number of duplicative groups that a user is subjected to when organizing photographs into groups corresponding to people who are depicted in the photographs using facial recognition technologies and associated workflows.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is presented with reference to the accompanying figures. In the figures, the left-most digit or two digits of a reference number identifies the figure in which the reference number first appears. The use of the same reference numbers in different instances in the description and the figures may indicate similar or identical items. Items represented in the figures may be indicative of one or more items, and thus reference may be made interchangeably to single or plural forms of the items in the description.

DETAILED DESCRIPTION

Overview

Figure 1A:
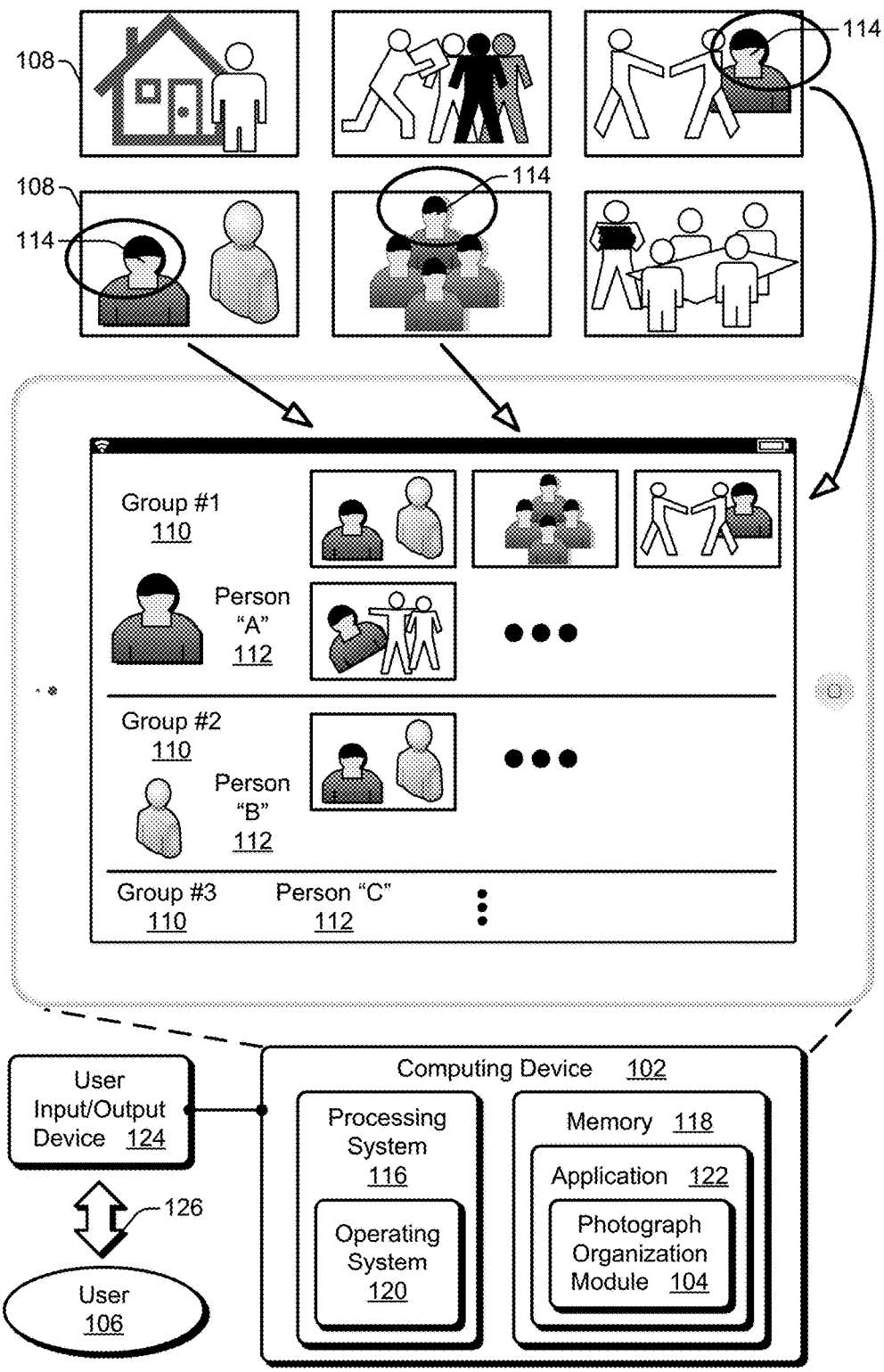
FIG. 1A illustrates an environment for example embodiments that are operable to employ techniques described herein that relate to photograph organization based on facial recognition.

Conventional facial recognition approaches can create multiple groups that correspond to a single person because of deficiencies in person-identification technology. More specifically, facial recognition can be negatively impacted by aspects of the photographs. For example, varying facial expressions, poses, or lighting conditions during the photographic capturing can hinder facial recognition. Noisy or redundant data contained in digital photographs captured by electronic sensors can further complicate facial recognition. Compression of data representing facial regions can also contribute to problems with facial recognition. Each of these aspects can affect the data that is used in person identification to produce somewhat defective data for use in determining whether two different sets of facial features correspond to two different persons or to a same person.

Conventional facial recognition approaches can also create duplicative groups because of deficiencies in person-identification workflows. Conventional approaches to a person-identification workflow can further exacerbate problems with facial recognition by analyzing the defective photographic data in only a single pass. Initially, faces are detected in photographs. A set of facial features is then determined for each detected face. The facial features are compared to each other in an attempt to identify unique persons in the detected faces. Each set of facial features for a detected face is assigned to an existing person group or labeled a new person group, depending on results of the comparisons of the facial feature sets. By limiting the analysis of the facial feature sets to a single pass like with a conventional person-identification workflow, multiple person groups are produced that actually correspond to the same person. Consequently, conventional approaches produce duplicative groups. These duplicative groups complicate a user's efforts to organize a collection of photographs because a user is forced to perform additional manual analysis of the photographic groups as well as to engage in more manual interaction with a computing device.

In contrast, example embodiments that are described herein utilize two passes across at least a portion of the faces that are detected in multiple photographs. In a first pass, each detected face is assigned to a group of multiple groups, with each group corresponding to a person of a population of persons for the multiple photographs. The population of persons evolves and expands as the first pass is made across the multiple photographs. With just the first pass, some of the assigned groups may correspond to duplicative persons. During the first pass, information pertaining to relationships between two groups is noted. Such group relationship information, which is described further below, indicates how similar a face that is assigned to one group is to one or more faces that are assigned to another group. During a second pass, the group relationship information is used as a guide to potentially merge groups that may correspond to a same person. After merging groups, fewer groups remain for manual review by a user, which saves the user time and effort. Furthermore, a photographic group with the most photographs of a given person has more such photographs after the second pass as a resulting of the group merging operation.

In example embodiments, a photograph organization module obtains a collection of photographs that include images of people. In a first phase of a photograph organization scheme, the photographs are analyzed to detect faces. Secondly, the photograph organization module calculates a facial representation of each detected face. A facial representation reflects certain attributes of a face, such as a distance between the eyes, a placement of a nose, and so forth. For a third phase, as part of a first pass across the faces, each facial representation is compared to the facial representations corresponding to groups associated with pre-existing persons of a population that is being built from the collection of photographs. The comparisons result in similarity scores, which indicate how much alike a given detected face is to one or more of those faces that were previously assigned to a particular group. In accordance with a grouping criterion of a grouping operation, the photograph organization module assigns a face being targeted for assignment to a particular existing group if the similarity score between the targeted face and the particular existing group indicates a match and if the similarity score for the particular existing group is stronger than other similarity scores between the targeted face and other existing groups.

These three phases are repeated for each detected face. At this point, however, some of the different groups are actually associated with a same person because some faces belonging to a same person were not correctly determined to be sufficiently similar so as to be deemed to belong to the same person. In other words, duplicative persons are unfortunately present in the population based on the detected faces and the facial recognition of the first pass. To merge some groups and at least reduce a number of duplicative persons, a second pass through at least some of the faces is made in a fourth phase. The focus of the second pass through the faces is determined with the first pass by making notations between two or more groups during the first pass. If a targeted face matches multiple existing groups based on the similarity scores during the third phase of the first pass, then the photograph organization module makes a notation linking the group to which the face is assigned, due to having the strongest similarity score, and the other matching groups. The notation indicates a group relationship.

For the fourth phase, a second pass is made through the faces with the noted group relationships serving to focus the analysis. For each group relationship that links a first group with a second group, the photograph organization module analyzes the faces assigned to each of the two groups. A merging operation is performed that uses similarity scores between faces of the two groups to determine whether the two groups are to be combined into a merged group based on a merging criterion. For example, if a certain percentage of faces from the first group are determined to match at least one face in the second group, the photograph organization module infers that the associated persons of the two groups are actually the same person. Thus, the first group and the second group are combined into a merged group. The photograph organization module repeats the merging operation for each of the noted group relationships. Consequently, a total resulting number of groups for a population of persons extracted from the collection of photographs is reduced.

In these manners, automatic organization of photographs based on facial recognition is enhanced for a user. Fewer groups of photographs that include respective corresponding persons are produced for a given collection of photographs because the photograph organization module deems fewer instances of a same person as being different people after the merging operation of the second phase. Further, the largest resulting photographic group for a given actual person includes more photographs after the automatic merging operation. A number of manual merging operations to be performed by a user is therefore at least reduced, if not eliminated. In other words, fewer clicks and less manual tagging input by a user are required to organize a collection of photographs into person-based groups based on the facial images of the people depicted in the photographs.

In the following discussion, after some example terminology is set forth, an example environment is described that may employ the techniques described herein. Example embodiment systems, machines, and techniques are then described, followed by a section explaining example embodiment procedures and processes. The procedures and processes may be performed in the example environment and systems as well as in other environments. However, performance of the example procedures is not limited to the example environment, and the example environment and systems are not limited to performance of the example procedures.

Terminology Examples

Example descriptions or explanations of certain terms as used herein are set forth below. Each term is applicable to one or more, but not necessarily all, embodiments that are presented herein. Some terms are further elucidated using one or more examples.

A "photograph" refers to a picture that originates in or is converted to a digital format. A photograph may depict images of one or more persons, including faces of the depicted people. A "face" refers to a portion of a person's head having facial features, such as eyes, nose, mouth, jawline, and so forth. Attributes of a given person's facial features can be unique for the given person.

A "face detection" refers to an identification of a region of a photograph that includes a face of a person. A "facial representation" refers to a set of data, such as a vector, that encapsulates potentially-distinguishing attributes of a face. A facial representation can include a distance between two facial features, relative sizes of two facial features, and so forth. An example of a facial representation is a face identification record (FIR).

"Facial recognition technology" refers to a capability, such as that of a computing module, to detect faces in images and distinguish between or among faces belonging to different people. Facial recognition technology may include an ability to identify one face as belonging to a particular person in a given population of persons. A "population"

refers to individual persons within a definable setting. For example, a population of a collection of photographs includes those persons depicted in the collection. A population may mistakenly include duplicative persons, such as a result of faulty facial recognition technology or associated workflow.

A "redundant analysis" refers to making repeated, such as at least two, investigations into faces depicted in multiple photographs. For example, a computing module may make two passes through at least a portion of the faces in the multiple photographs by considering a level of similarity between depicted faces that are distilled into respective facial representations. In a first pass, faces are assigned to groups in a grouping operation to generate multiple groups corresponding to persons of a population of people having images in the multiple photographs. In a second pass, some related groups are merged together in a merging operation to reduce a number of duplicative groups as a result of the redundant analysis.

A "grouping operation" refers to a procedure that separates faces of a photograph collection into different bins, or groups, such that each group corresponds to, and accumulates, detected faces that are deemed to belong to a single person. Additionally or alternatively, a "grouping operation" can refer to a procedure that separates photographs of a photograph collection into different bins, or groups, based on some criterion, such as per-person, per-location, per-month, per-event, and so forth.

A "group" refers to a set of data having an underlying commonality. Examples of groups include groups of faces, groups of photographs, and so forth. A group may include, for instance, a set of faces that are sufficiently similar to be deemed as belonging to a single person. A group may alternatively include a set of photographs that each include an image of face that is deemed to belong to a same person. A photograph having multiple faces may belong to multiple groups. A face may be assigned to a group based on a similarity score.

A "similarity score" refers to a measure of how alike two or more faces are to one another. A similarity score can be determined for two faces based on two respective facial representations. A similarity score may be determined between a face and a group of faces of multiple groups of faces to determine a strongest matching group for the face to be assigned to as part of a grouping operation.

A "group relationship indicator" refers to a notation that links two or more groups together as possibly corresponding to a same person. A grouping relationship indicator between two groups can be established during a first pass through a collection of photographs as part of a grouping operation if a face matches multiple existing groups for a population of faces. A "duplicative group" refers to a group of faces for which two or more groups have been created for a single actual person.

A "merging operation" refers to a procedure in which a number of duplicative groups can be reduced as part of a second pass through a collection of photographs. For the second pass, groups linked by a noted group relationship indicator are analyzed. For example, if a threshold percentage of faces in one group match with one or more faces of another group, the one group and the other group can be merged to reduce the number of duplicative groups generated by the first pass through the collection of photographs. A "merged group" refers to a group of faces that results after two groups from a first pass are combined into a single group as part of a second pass.

Also, unless context dictates otherwise, use herein of the word "or" may be considered use of an "inclusive or," or a term that permits inclusion or application of one or more items that are linked by the word "or" (e.g., a phrase "A or B" may be interpreted as permitting or being relevant to just "A," to just "B," or to both "A" and "B").

Example Environment

FIG. 1A illustrates an environment 100A for example embodiments that are operable to employ techniques described herein that relate to photograph organization based on facial recognition. As illustrated, the example environment 100A includes at least one computing device 102, at least one user input/output (I/O) device 124, and at least one user 106. FIG. 1A also depicts user interaction 126 between the user 106 and the user I/O device 124. The computing device 102 includes a processing system 116 and a memory 118. The processing system 116 includes an operating system 120. The memory 118 includes an application 122, which includes a photograph organization module 104. Example implementations for the computing device 102 are described further below in this section.

The environment 100A also includes multiple photographs 108, a portion of which are explicitly indicated by the reference number 108. The photographs 108 can be stored locally on the computing device 102, remotely on a server in the cloud, or some combination thereof. Although six photographs 108 are shown, dozens, hundreds, thousands, or more photographs 108 may be organized. In operation, the photograph organization module 104 organizes the photographs 108 based on facial recognition of those faces 114 that are present in the photographs 108. A facial recognition process can include detecting faces 114 and determining which faces 114 belong to a same person 112 by attempting to distinguish among multiple different persons 112. In example implementations, groups 110 of photographs 108 are produced such that each group 110 of photographs includes those photographs 108 having a respective person 112 corresponding to a respective group 110.

As shown on a display screen associated with the computing device 102, a group #1 110 corresponds to a person "A" 112. Also, a group #2 110 corresponds to a person "B" 112, and a group #3 110 corresponds to a person "C" 112. Although three persons 112 and three corresponding groups 110 are explicitly shown, more or fewer persons 112 or corresponding groups 110 may be identified or displayed. Because a photograph 108 may contain faces 114 of multiple different persons 112, the photograph 108 may correctly be included in multiple different groups 110. After the groups 110 are presented to the user 106, the user is empowered to label or tag the photographs 108 that belong to a particular group 110, such as by naming the corresponding person 112. If the facial recognition process fails to properly distinguish faces such that multiple groups 110 are created for a same person 112, duplicative groups 110 are presented to the user 106. This causes the user 106 to spend more time and a greater number of user interactions 126 to clean up the faulty facial recognition process. User time can be saved and user aggravation can be reduced if at least some duplicative groups 110 corresponding to a same person 112 are merged into a merged group 110. Example embodiments for merging groups 110 are described below in succeeding sections.

The computing device 102 may be implemented as any suitable type of computing device. Examples of end-user implementations for the computing device 102 include a desktop computer, a laptop or notebook computer, a mobile device (e.g., assuming a handheld configuration such as a mobile phone, a phablet, or a tablet—which is depicted in FIG. 1A), a mobile device coupled to a separate screen, an entertainment appliance such as a smart television, a game console, a device configured to receive gesture input, a device configured to receive speech or video input, a device configured to provide 2D or 3D image output, a device configured to provide sound output, a wearable computing device such as a smart watch or intelligent glasses, or some combination thereof. Thus, an end-user implementation of the computing device 102 may range from relatively high-resource devices with substantial memory and processor resources (e.g., personal computers or game consoles) to relatively low-resource devices with constrained memory or processing resources (e.g., mobile devices such as wearables). Examples of data center or server device implementations for the computing device 102 include a web server, a server running open source software, a server of a proprietary design, a stand-alone server, a server blade, an allocated portion of a server farm, server functionality that is distributed across at least one data center, cloud computing functionality, or some combination thereof.

The computing device 102 is illustrated as including a variety of hardware components, examples of which include: a processing system 116, an example of a computer-readable storage medium illustrated as memory 118, and so forth. Other hardware components are also contemplated as further described herein below with reference to FIG. 11. The processing system 116 is representative of functionality to perform operations through execution of instructions stored in the memory 118. Although illustrated separately, functionality of these components may be further divided, combined (e.g., on an application specific integrated circuit (ASIC) or as instructions are loaded onto a processor), and so forth. Examples of a user I/O device 124 include a keyboard, a mouse, a touchpad, a touch screen, a microphone, a camera, a display device such as a screen or projector, a speaker, or some combination thereof. The user I/O device 124 may be separate from, or integrated with, the computing device 102.

The computing device 102 is further illustrated as including an operating system 120. The operating system 120 is configured to abstract underlying functionality of the computing device 102 to the application 122 that is executable on the computing device 102. For example, the operating system 120 may abstract the processing system 116, the memory 118, the user I/O device 124, or other functionality of the computing device 102 such that the application 122 may be written without knowing exactly "how" this underlying functionality is specifically implemented. The application 122, for instance, may provide data to the operating system 120 to be rendered and displayed by a display device without understanding how this rendering will be performed, or the application 122 may receive from the operating system 120 data indicative of a user input event without knowing how the user I/O device 124 acquired the data. The operating system 120 may also represent a variety of other functionality, such as management of a file system or control of a user interface (UI) that is navigable by the user 106 of the computing device 102 via the user interaction 126.

In example implementations, a photograph organization module 104 is located at or executing on the computing device 102, such as by being part of the application 122, which may provide photograph management or editing functions to a user. The photograph organization module 104 represents functionality to implement schemes and techniques for photograph organization based on facial recognition as described herein. The photograph organization module 104 may be implemented as at least part of a software package that executes on and specially configures one or more processors; as a hardware apparatus; or using a combination of software, hardware, firmware, or fixed logic circuitry; with some combination thereof; and so forth. As described further herein below with reference to FIG. 11, the photograph organization module 104 may be fully or partially implemented as a web or cloud-based photographic service.

Having considered an example environment, consider now a discussion of some example details of systems, techniques, and schemes for photograph organization based on facial recognition in accordance with one or more embodiments.

Systems and Techniques

Figure 1B:
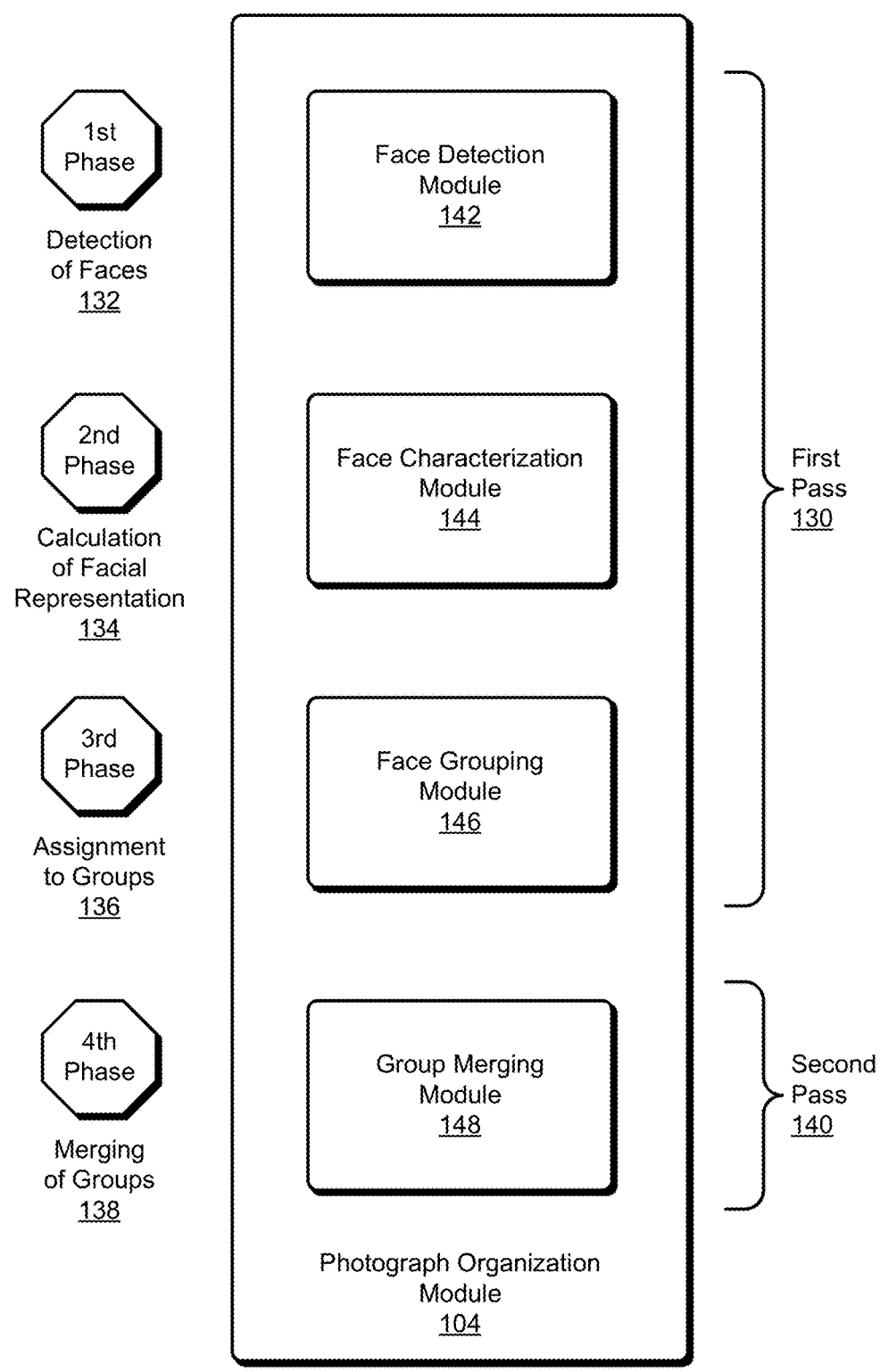
FIG. 1B depicts an example of a photograph organization module that includes four modules and relates the four modules to four respective phases as well as two passes of a photograph organization scheme.

FIG. 1B depicts an example of a photograph organization module 104 that includes four modules and relates the four modules to four respective phases as well as two passes of a photograph organization scheme 100B. As shown, the photograph organization module 104 includes a face detection module 142, a face characterization module 144, a face grouping module 146, and a group merging module 148. As illustrated, the photograph organization scheme 100B includes four phases: a first phase 132, a second phase 134, a third phase 136, and a fourth phase 138. The first phase 132 pertains to a detection of faces and can be implemented by the face detection module 142. The second phase 134 pertains to a calculation of facial representations and can be performed by the face characterization module 144. The third phase 136 pertains to an assignment of the detected faces to groups and can be performed by the face grouping module 146. The fourth phase 138 pertains to a merging of groups and can be performed by the group merging module 148.

In example implementations, a first pass 130 involves a first analysis of faces in multiple photographs. The first pass 130 includes the first phase 132, the second phase 134, and the third phase 136. A second pass 140 involves a second analysis of faces in the multiple photographs and includes the fourth phase 138. An example of the first pass 130 is described below with reference to FIG. 2. An example of the second pass 140 is described below with reference to FIG. 3. FIG. 4 illustrates a combination of the first pass 130 and the second pass 140 across the third phase 136 and the fourth phase 138.

Figure 2:
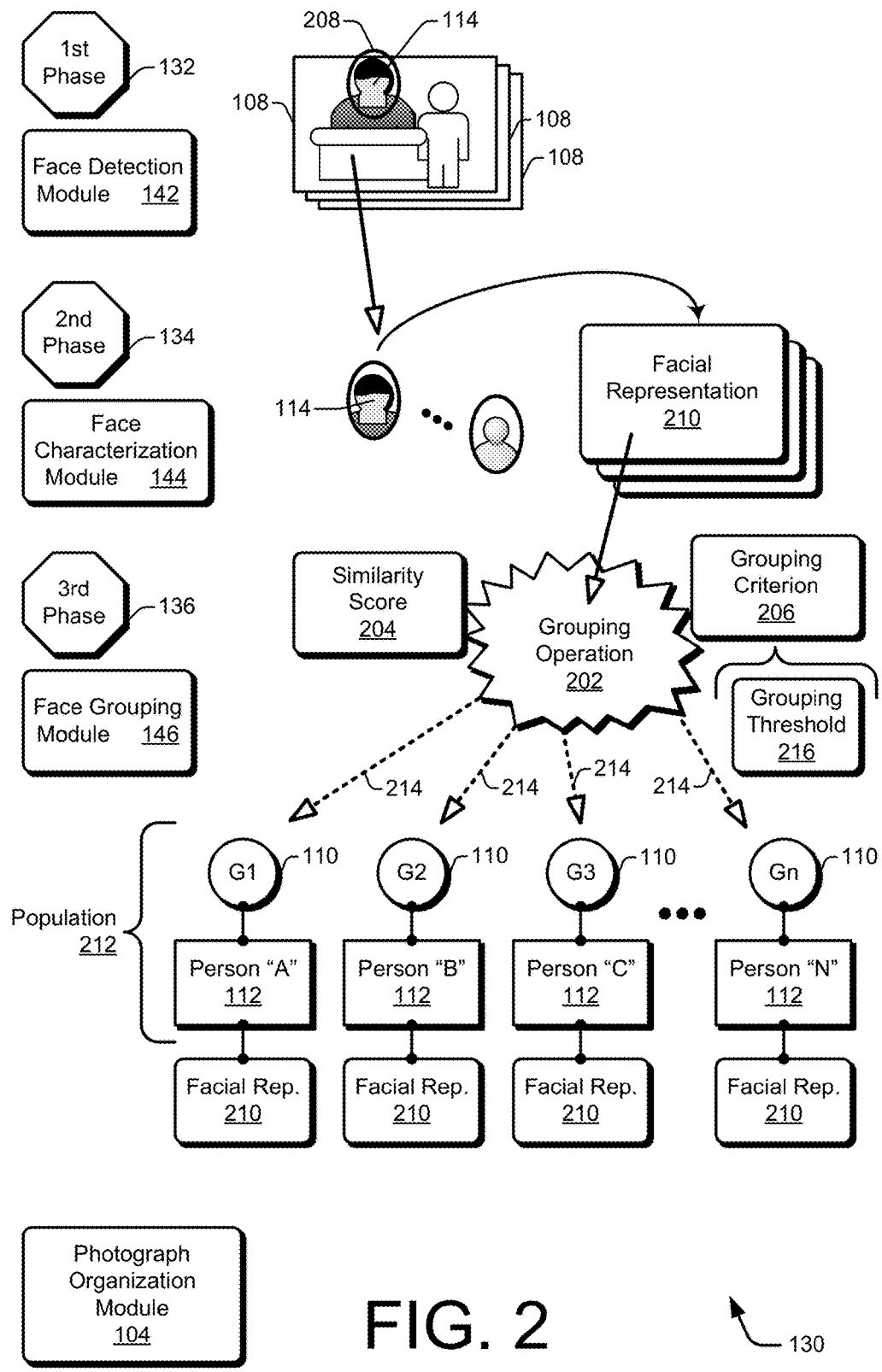
FIG. 2 illustrates an example of a first pass for a photograph organization scheme, with the first pass including a first phase, a second phase, and a third phase, as well as a grouping operation.

FIG. 2 illustrates an example of the first pass 130 for a photograph organization scheme, with the first pass 130 including the first phase 132, the second phase 134, and the third phase 136, as well as a grouping operation 202. As shown, the first pass 130 includes three phases. In the first phase 132, multiple faces 114 are detected in multiple photographs 108. In the second phase 134, multiple facial representations 210 are calculated for respective ones of the multiple detected faces 114. In the third phase 136, faces are assigned to groups 110 using similarity scores 204 that are derived from comparisons of the facial representations 210, as indicated by assignment arrows 214. The third phase 136 includes the grouping operation 202 that is performed based on at least one grouping criterion 206.

In example implementations for the first pass 130, the photograph organization module 104 attempts to determine a population 212 of persons 112 that are present in a collection of photographs 108. Each identified person 112 corresponds to a group 110, and each group 110 is associated with at least one facial representation 210. As shown, a first group "G1" corresponds to a person "A." Also, a second group "G2" corresponds to a person "B," and a third group "G3" corresponds to a person "C." Any number of persons 112 and corresponding groups 110 may be determined by the photograph organization module 104, as indicated by the nth group "Gn" that corresponds to a person "N."

In the first phase 132, the face detection module 142 of the photograph organization module 104 ascertains a facial region 208 in a photograph 108 to facilitate detection of a face 114. In the second phase 134, the face characterization module 144 calculates a facial representation 210 using attributes of the detected face 114. Examples of facial attributes include relative positions or sizes of the eyes, the nose, and the cheekbones; shapes of the eyes, the mouth, or the jawline; and combinations thereof. One or more facial attributes can be incorporated into the facial representation 210. A facial representation 210 may be realized as a vector representation of facial features that is extracted from a detected face. For instance, a face identification record (FIR) may be used as a facial representation 210. Facial recognition algorithms include geometric approaches and photometric approaches; however, other approaches may alternatively be implemented.

In the third phase 136, the face grouping module 146 compares respective facial representations 210 of respective faces 114 to facial representations 210 associated with the groups 110 to compute multiple similarity scores 204. Any of various approaches for comparing two or more faces 114 to compute at least one similarity score 204 may be employed in conjunction with the photograph organization schemes and techniques described herein. For instance, a distance between two FIR vectors may be computed. Using respective similarity scores 204 and at least one grouping criterion 206, the face grouping module 146 performs a grouping operation 202 to assign faces 114 to individual ones of the multiple groups 110, as indicated by the assignment arrows 214.

For the grouping operation 202, multiple comparisons are performed to group the faces 114 into the population 212 of persons 112. Each group 110 for the population 212 is associated with a facial representation 210. The associated facial representation 210 may be a facial representation 210 of an initial face assigned to the associated group 110, a facial representation 210 of a most-recent face assigned to the associated group 110, an average (e.g., mean, median, or mode of individual facial attributes or facial attributes overall) of facial representations 210 of two or more faces assigned to the associated group 110, another statistical-based combination of facial representations 210 of faces assigned to the associated group 110, some combination thereof, and so forth.

In an example, the grouping criterion 206 is implemented such that a facial representation 210 of a face 114 being targeted for assignment is compared to each facial representation 210 associated with the existing groups 110 of the population 212 to compute multiple similarity scores 204. A match is declared if a similarity score 204 comports with a grouping threshold 216 (e.g., is greater than or is greater than or equal to a predetermined threshold). Of the matching groups 110, the targeted face 114 is assigned to a group 110 having the strongest respective similarity score 204. Thus, the targeted face 114 is considered to be another instance of an image of the person 112 corresponding to the assigned group 110. If no match is found, the targeted face 114 is registered as a new person 112 corresponding to a new group 110 for the population 212.

Figure 3:
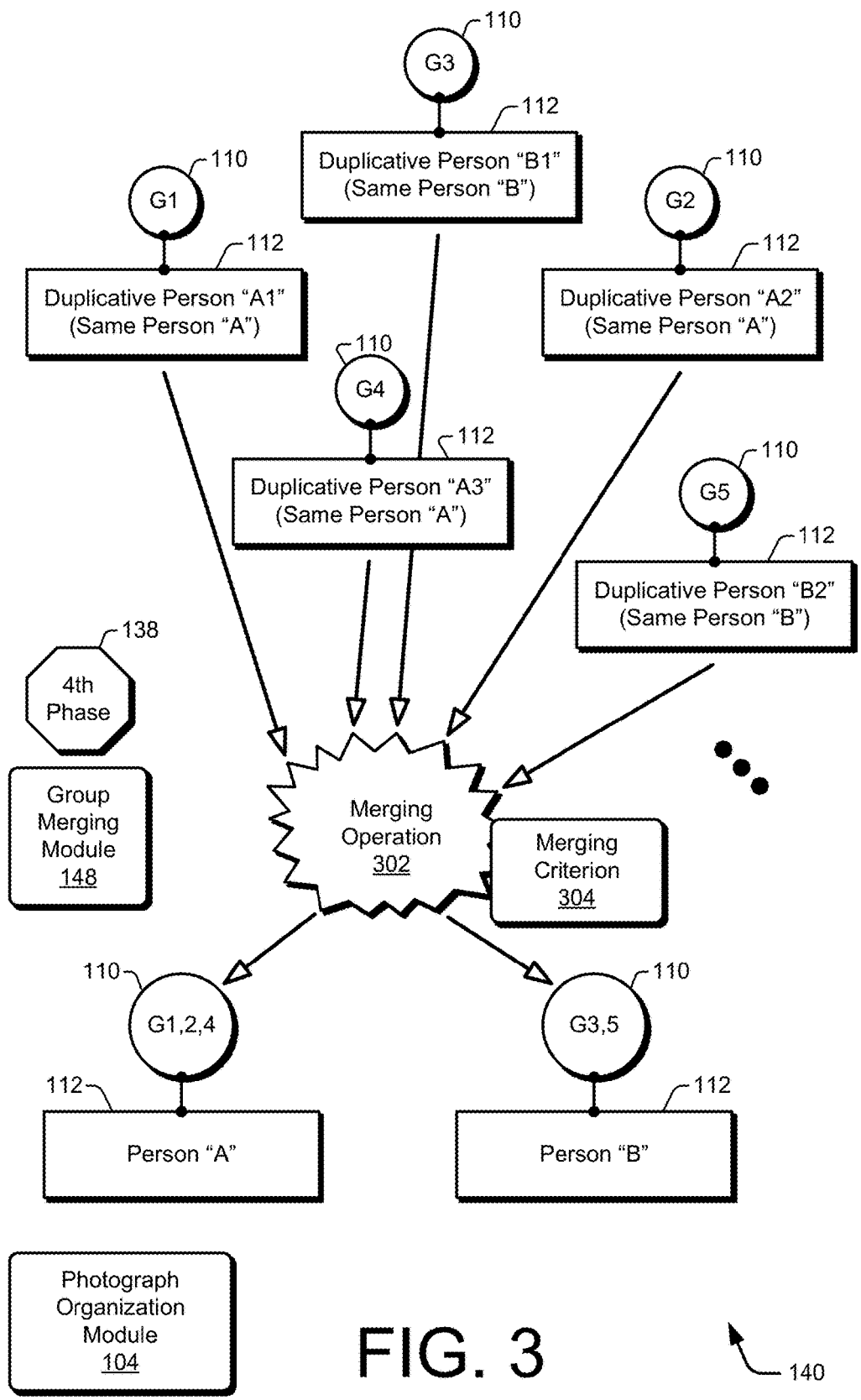
FIG. 3 illustrates an example of a second pass for a photograph organization scheme, with the second pass including a fourth phase, as well as a merging operation.
Figure 4:
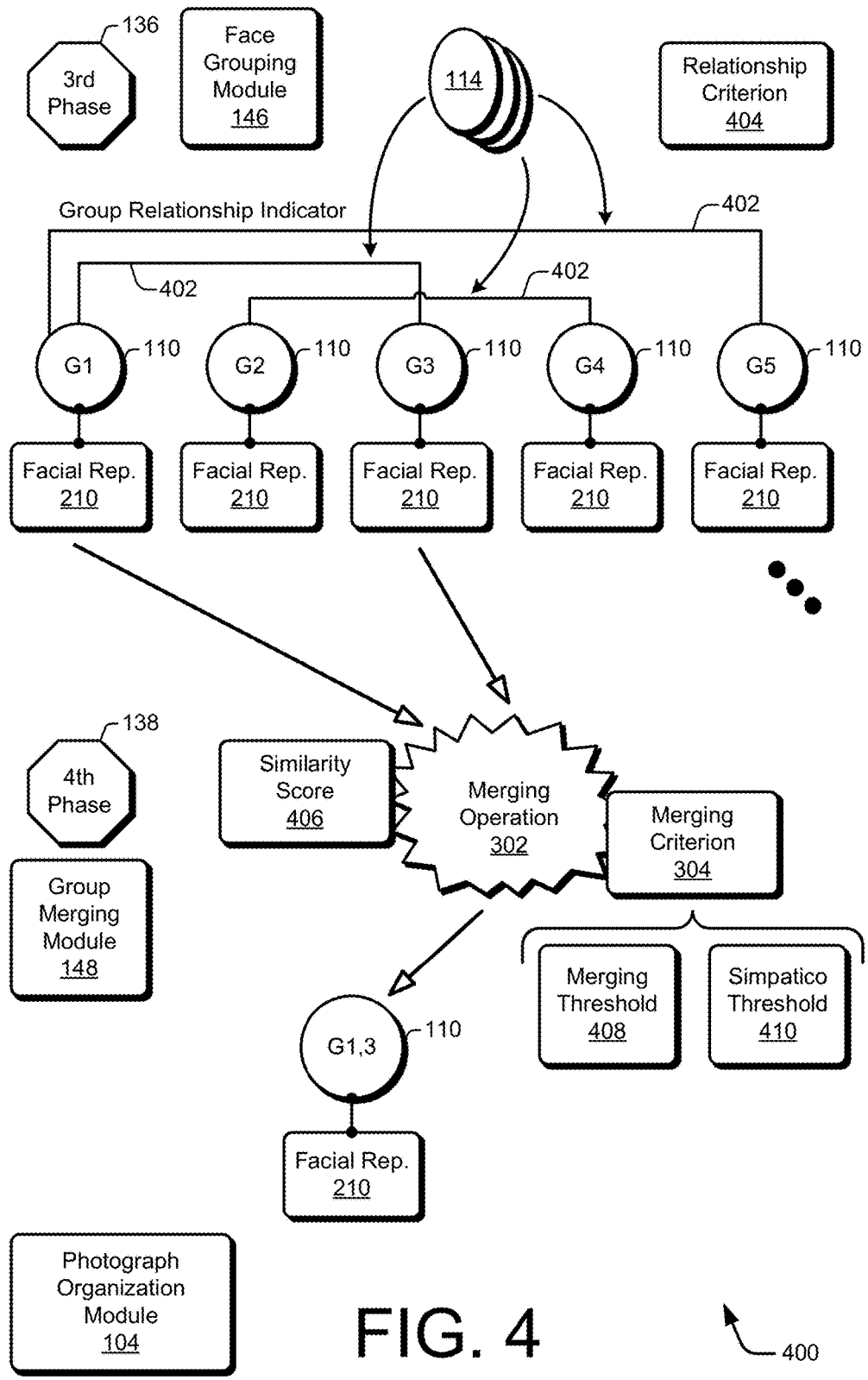
FIG. 4 illustrates an example approach to merging groups based on group relationship indicators as part of the third and fourth phases of a photograph organization scheme.

FIG. 3 illustrates an example of the second pass 140 for a photograph organization scheme, with the second pass 140 including the fourth phase 138, as well as a merging operation 302. Multiple groups 110 respectively correspond to multiple persons 112. As shown, the second pass 140 includes one phase, which is the fourth phase 138 of a photograph organization scheme. In the fourth phase 138, the group merging module 148 of the photograph organization module 104 merges two or more groups 110 as part of a merging operation 302 that is performed based on at least one merging criterion 304. With the third phase 136 of the first pass 130 (both of FIG. 2), some faces 114 are incorrectly deemed to be, and registered as, a new person 112 in the population 212 even though a particular face 114 actually belongs to a person 112 that already exists in the population 212. Consequently, duplicative persons 112 or duplicative groups 110 of persons are created during the first pass 130. This situation in which different groups 110 actually correspond to a single person 112 is depicted in the upper portion of FIG. 3.

In the upper portion of FIG. 3, groups G1, G2, G3, G4, and G5 are shown to be deemed as corresponding to different unique persons. Groups G1, G2, and G4 correspond to different persons 112 from the perspective of the face grouping module 146 (of FIG. 2) after the first pass 130 and before the second pass 140. Similarly, groups G3 and G5 are shown to correspond to different persons 112. Specifically, the group G1 corresponds to a duplicative person A1, the group G2 corresponds to a duplicative person A2, and the group G4 corresponds to a duplicative person A3. The group G3 corresponds to a duplicative person B1, and the group G5 corresponds to a duplicative person B2. The duplicative persons A1, A2, and A3 are actually a "same" person A. Similarly, the duplicative persons B1 and B2 are actually a "same" person B. In other words, the face grouping module 146 of the photograph organization module 104 failed to realize that the faces corresponding to groups G1, G2, and G4 are actually faces belonging to a single person 112 and that the faces corresponding to groups G3 and G5 are actually faces belonging to another single person 112.

The duplicative persons 112 and corresponding duplicative groups 110 complicate a user's efforts to organize his or her photographs 108 by the people depicted in the photographs 108. To shorten a time demanded by the photograph organization process, the photograph organization module 104 makes a second pass across at least some of the faces 114 of the photographs 108 to perform the merging operation 302 based on the merging criterion 304. Example implementations for the merging operation 302 and the merging criterion 304 are described below with reference to FIG. 4. In FIG. 3, however, a graphical illustration of a result of the merging operation 302 is shown with respect to the groups G1, G2, G3, G4, and G5. The group merging module 148 merges the groups G1, G2, and G4 into a merged group G1,2,4 that corresponds to the person A. The merging operation 302 also results in the groups G3 and G5 being combined into a merged group G3,5 that corresponds to the person B.

FIG. 4 illustrates an example approach 400 to merging groups 110 based on group relationship indicators 402 as part of a photograph organization scheme. As illustrated, the approach 400 includes at least part of the third phase 136 in the upper half of FIG. 4 and the fourth phase 138 in the lower half of FIG. 4. As part of the third phase 136, the face grouping module 146 establishes one or more group relationship indicators 402 that link one group 110 to another group 110 based on a relationship criterion 404. As described above with reference to FIG. 2, the face grouping module 146 assigns a face 114 to a particular group 110 if the similarity score 204 for the face 114 with respect to the particular group 110 exceeds the grouping threshold 216 and is the strongest (e.g., greatest) similarity score 204 among one or more groups 110 that match the face 114.

In other words, a face 114 can be determined to match a given group 110, but that determination may be discarded if the match is not the best match based on the similarity scores 204. In certain example implementations, however, the face grouping module 146 preserves this information by making a notation in the form of a group relationship indicator 402 in accordance with the relationship criterion 404. If a face 114 has a strongest match with one group 110 but also matches another group 110, the face grouping module 146 assigns the face 114 to the one group 110 and establishes a group relationship indicator 402 between the one group 110 and the other group 110. For instance, if a face 114 matches group G1 and group G3 with a stronger match with group G3, the face grouping module 146 assigns the face 114 to the group G3 and establishes a group relationship indicator 402 that links the group G3 and the group G1.

For the second pass 140 (of FIG. 3), the fourth phase 138 entails analyzing at least some of the faces 114 again responsive to the group relationship indicators 402 that are established during the third phase 136. For a given group relationship indicator 402, the group merging module 148 considers the facial representations 210 of the faces 114 belonging to each of the two groups 110 linked by the group relationship indicator 402. Faces 114 of one group 110 are compared to faces 114 of another group 110 to compute multiple similarity scores 406 between or among at least two facial representations 210 of the faces 114. The similarity scores 204 for the grouping operation 202 (of FIG. 2) may be the same as or different from the similarity scores 406 of the merging operation 302.

If the multiple similarity scores 406 comport with at least one merging criterion 304, the group merging module 148 merges the one group 110 and the other group 110 to produce a merged group 110. For instance, if the multiple similarity scores 406 for the facial representations 210 of the faces 114 of the group G1 and the group G3 comport with the merging criterion 304, the group merging module 148 merges the group G1 with the group G3 into a merged group G1,3, with the merged group 110 corresponding to a facial representation 210 for the merged group. The merging criterion 304 can include a merging threshold 408 and a simpatico threshold 410. The merging threshold 408 relates to a similarity level to be met by a similarity score 406 to determine a match, and the simpatico threshold 410 relates to a proportion of faces 114 in at least one of the two groups 110 that are to achieve a match in order for a merge to be performed. For instance, if a certain percentage of faces 114 of one group 110 in accordance with the simpatico threshold 410 match at least one face 114 of the other group 110 in accordance with the merging threshold 408, then the merging criterion 304 is satisfied, and the group merging module 148 infers that the two separate groups actually correspond to a single person. These thresholds are further described with reference to FIG. 5.

Figure 5:
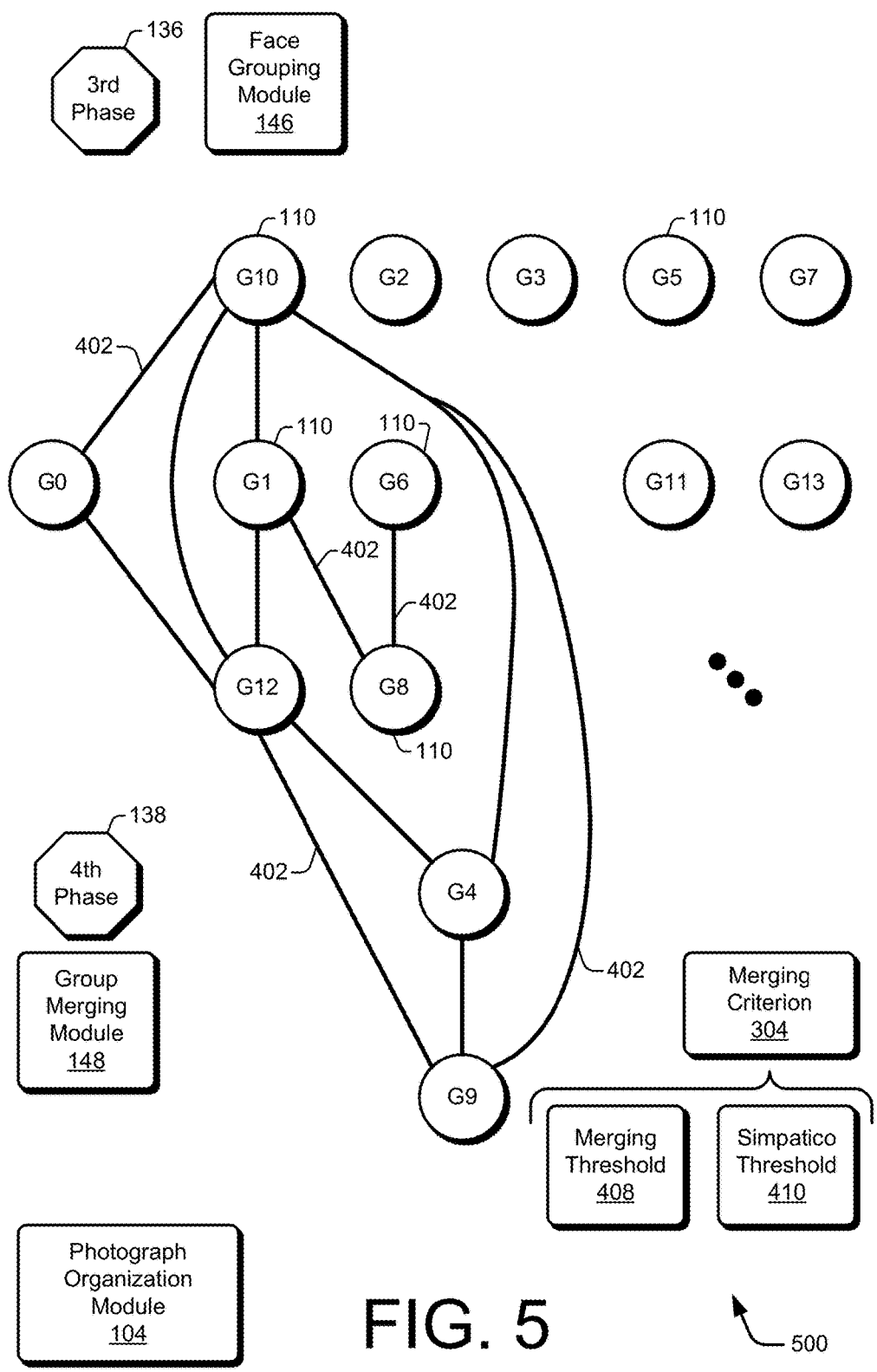
FIG. 5 illustrates an example graphical approach to implementing group relationship indicators as part of the third and fourth phases of a photograph organization scheme.

FIG. 5 illustrates an example graphical approach 500 to implementing group relationship indicators 402 as part of the third phase 136 and the fourth phase 138 of a photograph organization scheme. Generally, a population 212 of persons 112 that have been assigned to groups 110, along with any relationships determined to exist between the groups 110, may be represented using a graph. In the graphical approach 500, each vertex in the graph represents a group 110, and each edge between two vertices represents a group relationship indicator 402, which means that the two linked groups may potentially belong to a same person.

During the third phase 136, when the face grouping module 146 assigns a face to a strongest matching group (e.g., G1) out of a matching set of groups (e.g., {G1, G2, G3, . . . , Gx}), the face grouping module 146 also creates edges between the strongest matching group G1 and rest of the groups in the matching set (e.g., {G2, G3, G4, . . . , Gx}). As shown, the example graphical approach 500 includes 14 vertices that correspond to 14 groups 110: G0, G1, G2, G3, . . . , G11, G12, G13. Some of the vertices, or groups 110, are linked to at least one other group 110 by an edge that represents a group relationship indicator 402. For instance, assume for a face F1 that the matching set is {G8, G6, G1} with the vertex/group G8 being the strongest match. In this case, the face F1 is assigned to the group G8 and respective edges are created between groups G8 and G1 and between groups G8 and G6.

During the fourth phase 138, the group merging module 148 checks connected vertices (e.g., groups 110 linked by a group relationship indicator 402) to determine if faces 114 that are actually of a same person 112 have been assigned to different groups. Connected vertices are checked to determine if the groups 110 comport with at least one merging criterion 304. In example implementations, the at least one merging criterion 304 includes the merging threshold 408 and the simpatico threshold 410. The merging threshold 408 specifies a similarity level at which facial representations 210 of faces 114 in one group 110 are deemed to match facial representations 210 of faces 114 in another group 110. The simpatico threshold 410 specifies a percentage of matching facial representations 210 between faces 114 in the one group 110 and faces 114 in the other group 110 at which the two groups 110 are deemed to correspond to a same person 112.

For instance, for two groups 110 that are linked by a group relationship indicator 402 to be merged, at least x % of faces in the smaller of the two groups are first determined to match with any face in the larger of the two groups with a merging threshold greater than y. With reference to the example graphical approach 500, assume that x=60 and y=0.8 and that group G8 has 10 faces and group G1 has 20 faces. If at least six faces in group G8 match with any of the faces in group G1 with more than a 0.8 similarity level, group G1 and group G8 are deemed to belong to a same person and are merged into a merged group G1,8 (not shown).

Having discussed example details of systems, techniques, and schemes for photograph organization based on facial recognition, consider now some example procedures to illustrate additional aspects of the techniques.

Example Procedures

Figure 6:
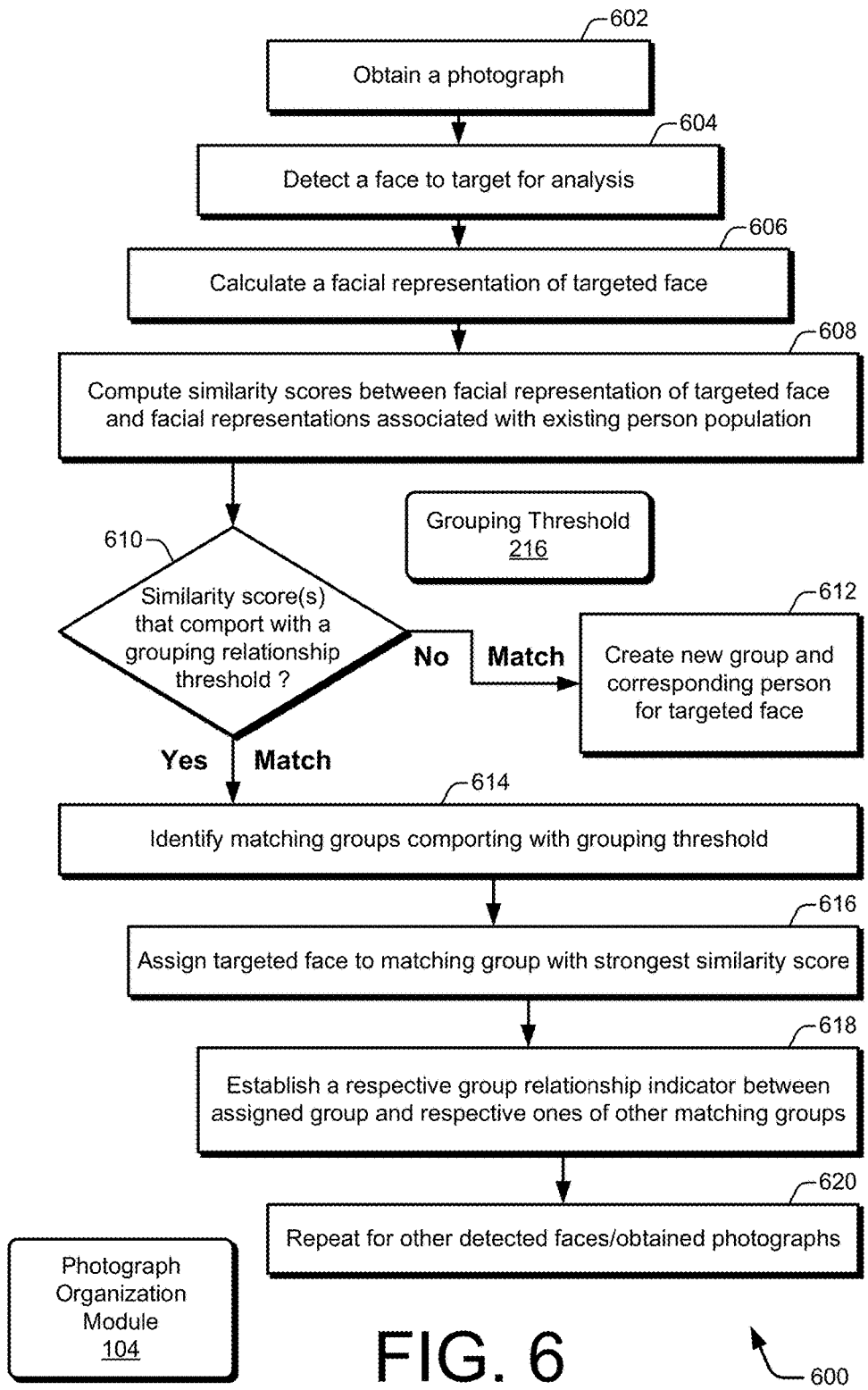
FIG. 6 is a flow chart illustrating an example procedure for a first pass of a photograph organization scheme.
Figure 7:
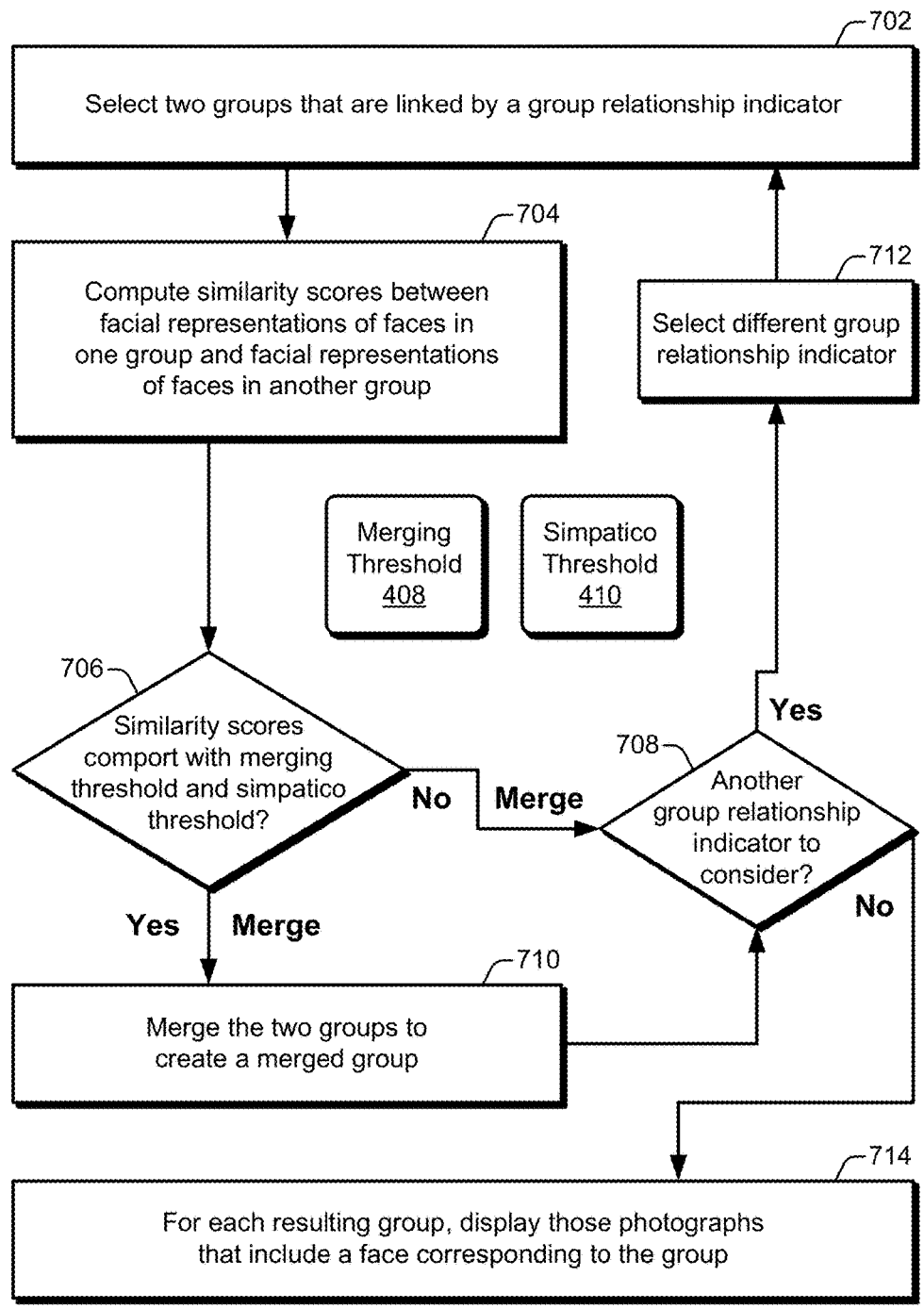
FIG. 7 is a flow chart illustrating an example procedure for a second pass of the photograph organization scheme.
Figure 8:
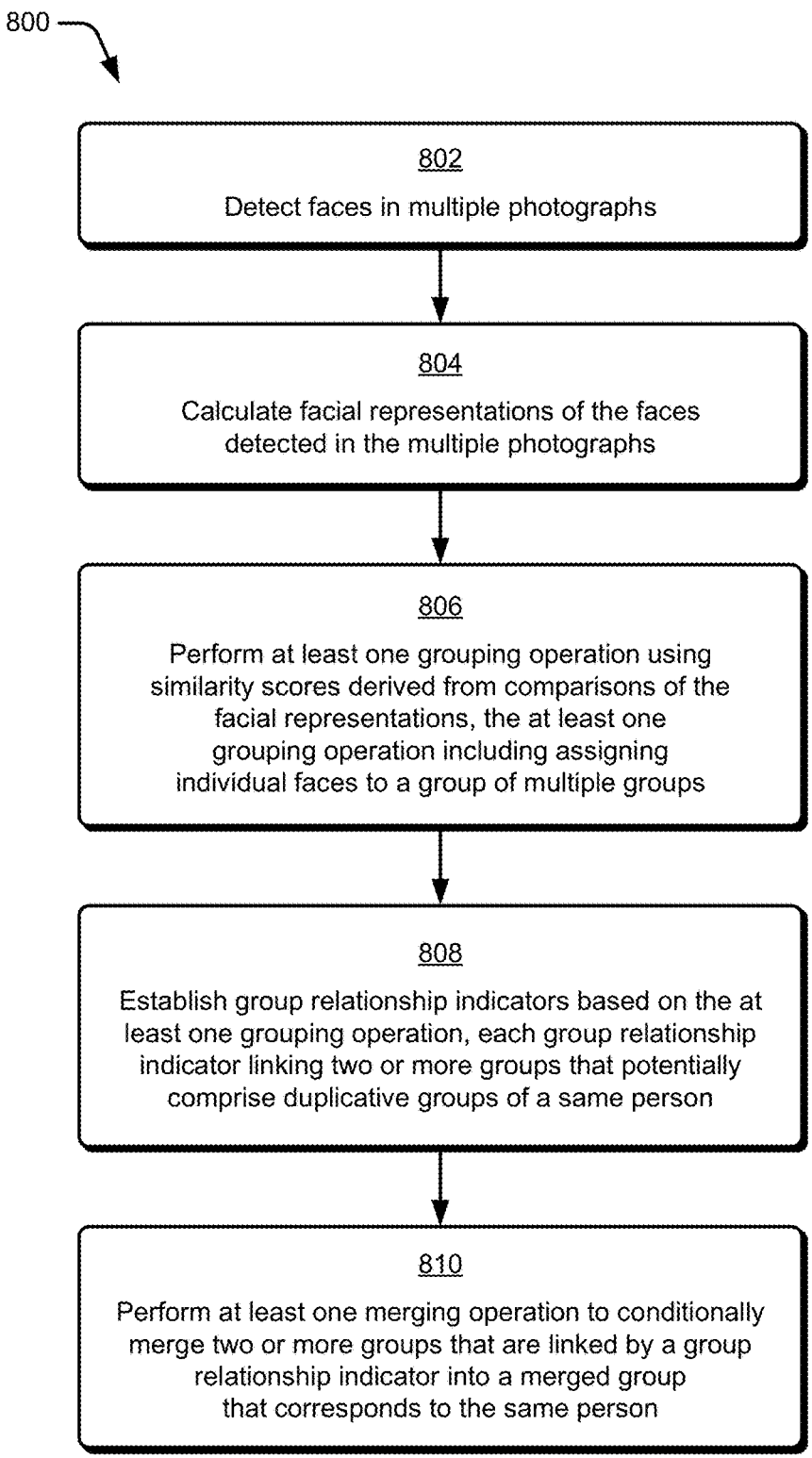
FIG. 8 is a flow diagram illustrating an example procedure in accordance with one or more example embodiments.
Figure 9:
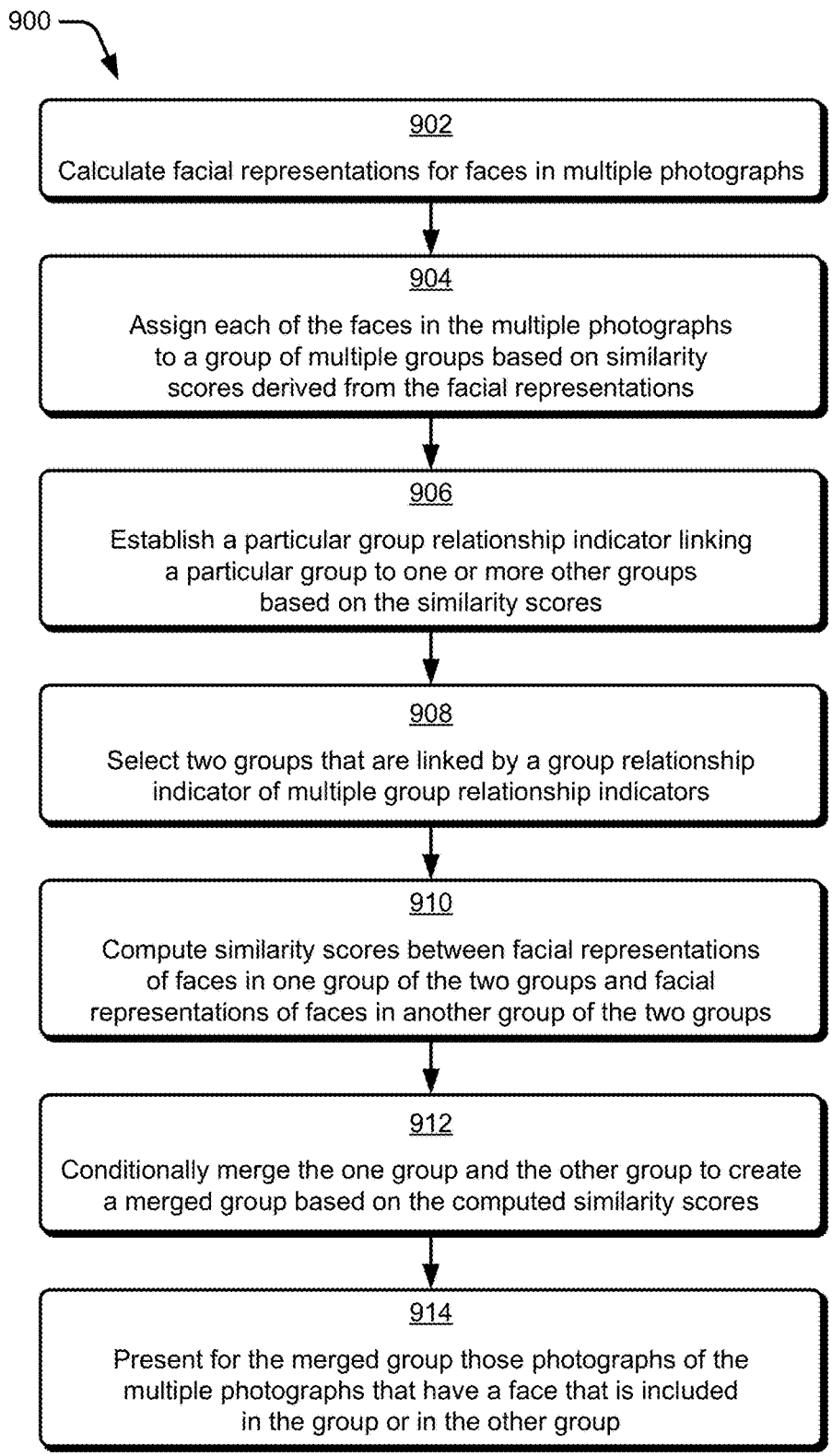
FIG. 9 is another flow diagram illustrating another example procedure in accordance with one or more example embodiments.
Figure 10:
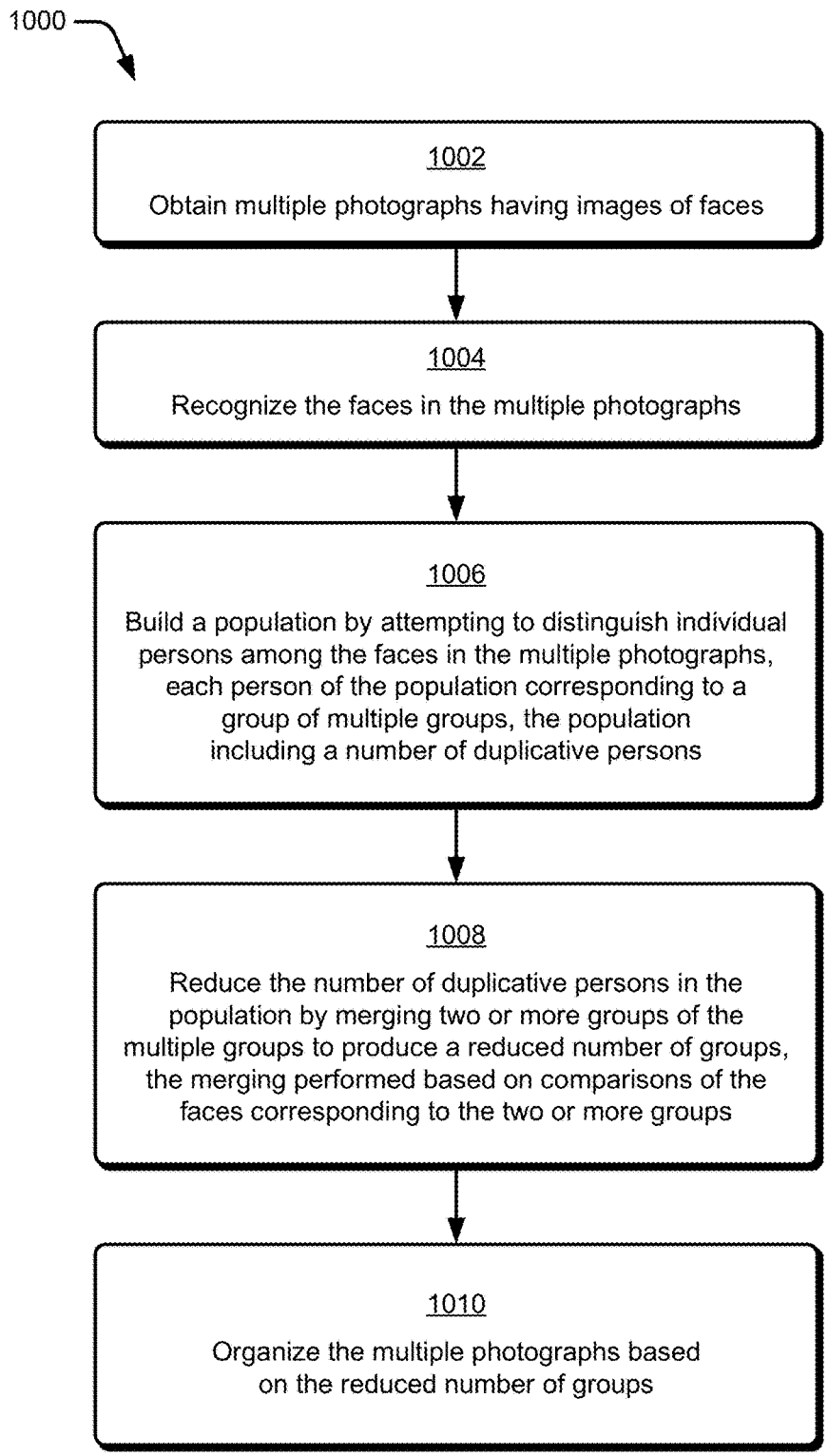
FIG. 10 is yet another flow diagram illustrating yet another example procedure in accordance with one or more example embodiments.

This section describes with reference to FIGS. 6-10 example procedures relating to photograph organization based on facial recognition in one or more embodiments. The procedures of FIG. 6 and FIG. 7 are depicted with flow charts that correspond to a first pass and a second pass, respectively. The procedures of FIGS. 8-10 are depicted with flow diagrams. Aspects of the procedures may be implemented in hardware, firmware, or software, or a combination thereof. The procedures are shown as sets of blocks that specify operations that may be performed by one or more devices, but performance of the operations is not necessarily limited to the orders as shown by the respective blocks or as described herein, for the operations may be performed in other orders or in fully or partially overlapping manners. In at least some embodiments, the procedures may be performed by a suitably configured device, such as an example computing device 102 that makes use of a photograph organization module 104 (e.g., of FIGS. 1A, 1B, and 11).

FIG. 6 is a flow chart illustrating an example procedure 600 for a first pass of a photograph organization scheme. The procedure 600 illustrates ten example operations 602-620 for the first pass 130 that includes the first phase 132, the second phase 134, and the third phase 136 (of FIGS. 1B, 2, and 4). At operation 602, a photograph 108 is obtained. For example, multiple photographs 108 may be retrieved from local memory or from a remote photo repository. At operation 604, the face detection module 142 detects a face 114 to target for analysis. For example, a facial region 208 in a digital image may be detected. At operation 606, the face characterization module 144 calculates a facial representation 210 of the targeted face 114.

At operation 608, multiple similarity scores 204 between the facial representation 210 of the targeted face 114 and multiple facial representations 210 associated with existing persons 112 or groups 110 of a population 212 are computed. At operation 610, whether there are one or more similarity scores 204 that comport with a grouping threshold 216 is determined by the face grouping module 146 in accordance with a grouping criterion 206. For example, the face grouping module 146 (e.g., of FIGS. 1B and 2) may determine if one or more similarity scores 204 are equal to or greater than a similarity level set for the grouping threshold 216. If not, there are no facial matches. With no matches to existing faces, a new group 110 is created that corresponds to a person 112 having the targeted face 114 at operation 612.

On the other hand, if there are one or more facial matches, then at operation 614 the matching groups 110 having respective similarity scores 204 that comport with the grouping threshold 216 are identified. For example, a targeted face 114 may match three existing groups 110 (e.g., groups α, β, and γ) because each has a similarity score 204 equal to or greater than a grouping threshold of 0.75. At operation 616, the face grouping module 146 assigns the targeted face 114 to the matching group 110 having the strongest similarity score 204. For example, the targeted face 114 may be assigned to a group α that has a similarity score of 0.90 with the targeted face 114 if the groups β and γ have similarity scores of 0.80 and 0.86, respectively. At operation 618, a respective group relationship indicator 402 between the assigned group 110 and respective ones of other matching groups 110 is/are established. For example, a notation α-β that group α is related to group β and a notation α-γ that group α is related to group γ may be stored in memory. At operation 620, the operations of the first phase 130 are repeated for other detected faces 114 of a current photograph 108 starting at operation 604 and then for other obtained photographs 108 starting at operation 602.

FIG. 7 is a flow chart illustrating an example procedure 700 for a second pass of a photograph organization scheme. The procedure 700 illustrates seven example operations 702-714 for the second pass 140 that includes the fourth phase 138 (of FIGS. 1B, 3, and 4). At operation 702, two groups 110 that are linked by a group relationship indicator 402 are selected. For example, group α and group β may be selected because the pair of groups 110 are linked by a notation α-P. At operation 704, multiple similarity scores 406 are computed between the facial representations 210 in one group 110 and the facial representations 210 in another group 110.

At operation 706, the group merging module 148 determines if the multiple similarity scores 406 comport with the merging threshold 408 and the simpatico threshold 410 in accordance with the merging criterion 304. For example, for a merging threshold level of 0.70 and a simpatico threshold percentage of 75%, three-quarters of the facial representations 210 of the faces 114 in the group α are to match a facial representation 210 of at least one face 114 in the group β to at least a 0.70 level in order for the similarity scores 406 of the faces 114 in the groups α and β to comport with both of the two thresholds. If not, then the two groups 110 under examination are not merged, and the procedure continues at operation 708 in which a determination is made as to whether there is another group relationship indicator 402 to consider. On the other hand, if the similarity scores 406 of the faces 114 of the two groups 110 do comport with the merging threshold 408 and with the simpatico threshold 410 in accordance with the merging criterion 304, the group merging module 148 merges the two groups 110 to create a merged group 110 at operation 710. For example, group α and group β can be merged to create a merged group α/β that includes the faces 114 of both group α and group β. After operation 710, the procedure 700 continues at operation 708.

At operation 708, the group merging module 148 determines if there is another group relationship indicator 402 to consider. If so, then a different group relationship indicator 402 is selected at operation 712, and the procedure 700 repeats starting at operation 702. If there is not another group relationship indicator 402 to consider, then the second pass may conclude, but the procedure 700 continues at operation 714. At operation 714, the photograph organization module 104 displays, for each given group 110 that remains after the merging operation 302, those photographs 108 that depict a face 114 corresponding to the given group 110.

FIG. 8 is a flow diagram 800 that includes five blocks 802-810 and that illustrates an example procedure for photograph organization based on facial recognition in accordance with one or more example embodiments. At block 802, faces in multiple photographs are detected. For example, a face detection module 142 may detect faces 114 in multiple photographs 108. At block 804, facial representations of the faces detected in the multiple photographs are calculated. For example, a face characterization module 144 may calculate facial representations 210 of the faces 114 detected in the multiple photographs 108.

At block 806, at least one grouping operation is performed using similarity scores derived from comparisons of the facial representations, with the at least one grouping operation including assigning individual faces to a group of multiple groups. For example, a face grouping module 146 may perform at least one grouping operation 202 using similarity scores 204 derived from comparisons of the facial representations 210. The at least one grouping operation 202 includes assigning individual faces 114 to a group 110 of multiple groups 110. To do so, the face grouping module 146 may assign a face 114 to a group 110 to which the face 114 has a strongest similarity score 204 that comports with a grouping threshold 216.

At block 808, group relationship indicators are established based on the at least one grouping operation, with each group relationship indicator linking two or more groups that potentially comprise duplicative groups of a same person. For example, the face grouping module 146 may establish group relationship indicators 402 based on the at least one grouping operation 202, with each group relationship indicator 402 linking two or more groups 110 that potentially comprise duplicative groups 110 of a same person 112. For instance, group relationship indicators 402 may be established between the group 110 to which the face 114 is assigned and one or more other groups 110 to which the face 114 also matches in accordance with the grouping threshold 216.

At block 810, at least one merging operation is performed to conditionally merge two or more groups that are linked by a group relationship indicator into a merged group that corresponds to the same person. For example, a group merging module 148 may perform at least one merging operation 302 to conditionally merge two or more groups 110 that are linked by a group relationship indicator 402 into a merged group 110 that corresponds to the same person 112. To effectuate the merging operation 302, similarity scores 406 between the faces 114 of two linked groups 110 may be analyzed with regard to a merging threshold 408 and a simpatico threshold 410.

FIG. 9 is a flow diagram 900 that includes seven blocks 902-914 and that illustrates another example procedure for photograph organization based on facial recognition in accordance with one or more example embodiments. At block 902, facial representations may be calculated for faces in multiple photographs. For example, a computing device 102 may calculate facial representations 210 for faces 114 in multiple photographs 108.

At block 904, each of the faces in the multiple photographs is assigned to a group of multiple groups based on similarity scores derived from the facial representations. For example, the computing device 102 may assign each of the faces 114 in the multiple photographs 108 to a group 110 of multiple groups 110 based on similarity scores 204 derived from the facial representations 210. To do so, the computing device 102 may determine if any one or more of the similarity scores 204 between a face 114 and existing groups 110 comport with a grouping threshold 216.

At block 906, a particular group relationship indicator linking a particular group to one or more other groups is established based on the similarity scores. For example, the computing device 102 may establish a particular group relationship indicator 402 linking a particular group 110 to one or more other groups 110 based on the similarity scores 204. For instance, a group relationship indicator 402 may be established between a group 110 to which a face 114 is assigned responsive to a strongest similarity score 204 and one or more other groups 110 for which a similarity score 204 comports with a grouping threshold 216.

At block 908, two groups that are linked by a group relationship indicator of multiple group relationship indicators are selected. For example, the computing device 102 may select two groups 110 (e.g., a group G1 and a group G3 of FIG. 4) that are linked by a group relationship indicator 402 of multiple group relationship indicators 402.

At block 910, similarity scores are computed between facial representations of faces in one group of the two groups and facial representations of faces in another group of the two groups. For example, the computing device 102 may compute similarity scores 406 between facial representations 210 of faces 114 in one group 110 (e.g., group G1 of FIG. 4) of the two groups 110 and facial representations 210 of faces 114 in another group 110 (e.g., group G3) of the two groups 110.

At block 912, the one group and the other group are conditionally merged to create a merged group based on the computed similarity scores. For example, the computing device 102 may conditionally merge the one group 110 (e.g., group G1 of FIG. 4) and the other group 110 (e.g., group G3) to create a merged group 110 (e.g., group G1,3) based on the computed similarity scores 406. To effectuate a conditional merging, the computing device 102 may merge those linked pairs of groups 110 that comport with a merging criterion 304. The merging criterion 304 includes a merging threshold 408 that defines a level of similarity and a simpatico threshold 410 that defines a frequency of occurrence for achieving the level of similarity.

At block 914, those photographs of the multiple photographs that have a face that is included in the group or in the other group are presented for the merged group. For example, the computing device 102 may present for the merged group 110 (e.g., group G1,3 of FIG. 4) those photographs 108 of the multiple photographs 108 that have a face 114 that was assigned to the group 110 (e.g., group G1) or to the other group 110 (e.g., group G3). For instance, the computing device 102 may display those photographs 108 having a face 114 that is now part of the merged group 110 in a manner that indicates to a user 106 that each of the displayed photographs 108 have been determined to include a common human subject.

FIG. 10 is a flow diagram 1000 that includes five blocks 1002-1010 and that illustrates yet another example procedure for photograph organization based on facial recognition in accordance with one or more example embodiments. At block 1002, multiple photographs having images of faces are obtained. For example, a photograph organization module 104 may obtain multiple photographs 108 having images of faces 114. At block 1004, the faces in the multiple photographs are recognized. For example, the photograph organization module 104 may recognize the faces 114 in the multiple photographs 108. To do so, the photograph organization module 104 may detect the faces 114 and characterize the faces 114 by distilling attributes of the faces into facial representations 210, such as a face identification record (FIR).

At block 1006, a population is built by attempting to distinguish individual persons among the faces in the multiple photographs, with each person of the population corresponding to a group of multiple groups and the population including a number of duplicative persons. For example, the photograph organization module 104 may build a population 212 by attempting to distinguish individual persons 112 among the faces 114 in the multiple photographs 108, with each person 112 of the population 212 corresponding to a group 110 of multiple groups 110. The photograph organization module 104 may, for instance, form person-based groups 110 by determining if a computed similarity score 204 between a facial representation 210 for a targeted face 114 and a facial representation 210 associated with an existing group 110 comports with a grouping threshold 216. At this stage of the process, between a first pass 130 and a second pass 140 across the detected faces 114, the population 212 may include a number of duplicative persons 112.

At block 1008, the number of duplicative persons in the population is reduced by merging two or more groups of the multiple groups to produce a reduced number of groups, with the merging performed based on comparisons of the faces corresponding to the two or more groups. For example, the photograph organization module 104 may reduce the number of duplicative persons 112 in the population 212 by merging two or more groups 110 of the multiple groups 110 to produce a reduced number of groups 110. The photograph organization module 104 may perform the merging based on comparisons of the faces 114 corresponding to the two or more groups 110. To do so, the photograph organization module 104 may determine that two groups 110 both correspond to a same person 112, and thus merge the two groups 110, if faces 114 of one group 110 match at least one face 114 in the other group 110 to a similarity level that comports with a merging threshold 408 at an occurrence level that comports with a simpatico threshold 410.

At block 1010, the multiple photographs are organized based on the reduced number of groups. For example, the photograph organization module 104 may organize the multiple photographs 108 based on the reduced number of groups 110. To effectuate a photograph organization, the photograph organization module 104 may tag the multiple photographs 108, display the multiple photographs 108, or store the multiple photographs 108 based on the reduced number of groups 110.

Having described example procedures in accordance with one or more embodiments, consider now an example system and device that can be utilized to implement the various schemes and techniques described herein.

Example System and Device

Figure 11:
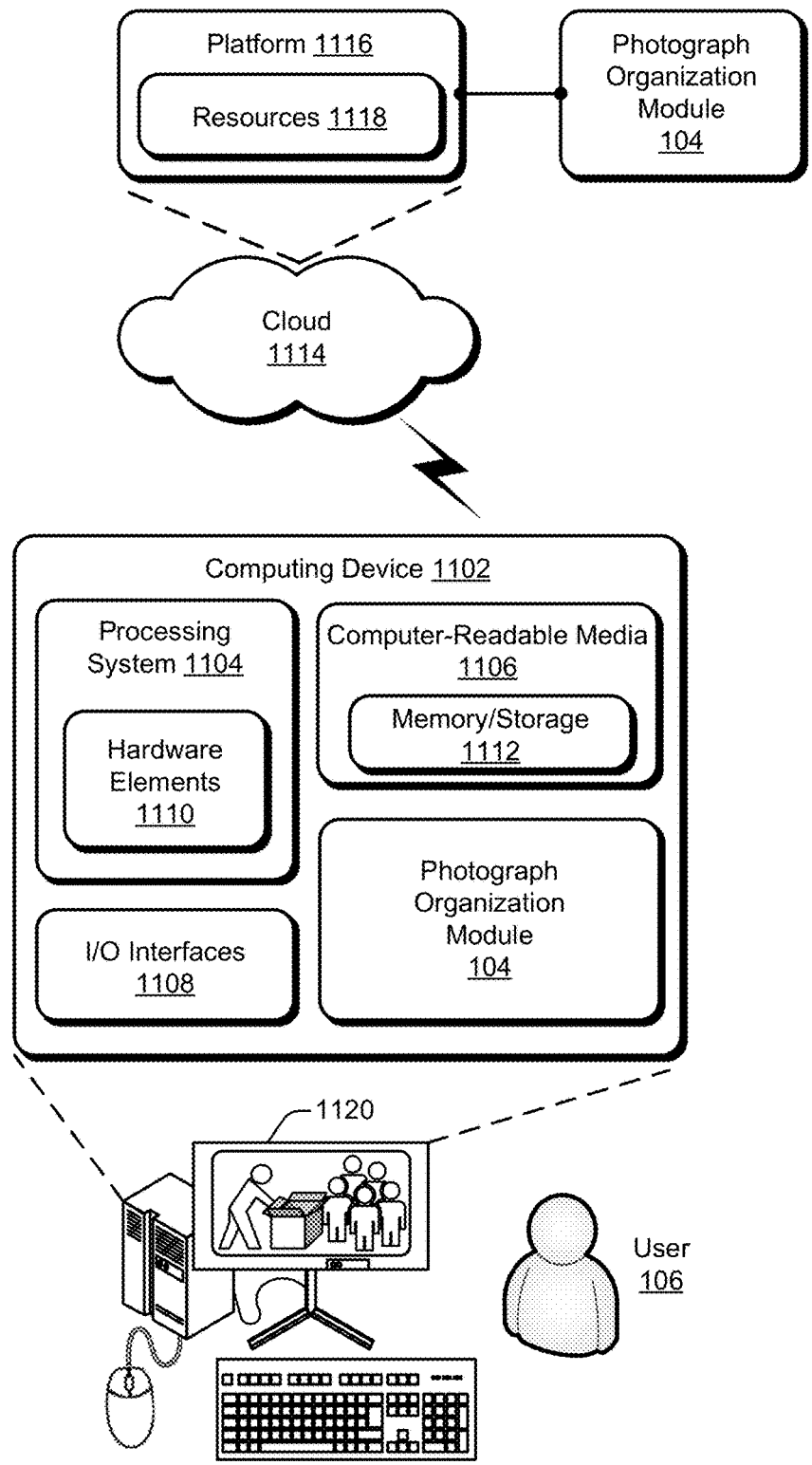
FIG. 11 illustrates an example system including various components of an example device that can be employed for one or more embodiments of photograph organization based on facial recognition.

FIG. 11 illustrates an example system generally at 1100 that includes an example computing device 1102 that is representative of one or more computing systems or computing devices that may implement the various techniques described herein. This is illustrated through inclusion of a photograph organization module 104, which may operate as described herein above. A computing device 1102 may be implemented as, for example, a computing device 102 (of FIG. 1A) that is coupled to a display 1120 for a user 106. The computing device 1102 can present photographs in groups to the user 106 using the display 1120. Generally, a computing device 1102 may be implemented as, for example, an end-user device (e.g., a client side device) of a user 106, a corporate device (e.g., a server side device or data center hardware), an on-chip system or system-on-a-chip (SOC), or any other suitable computing device or computing system.

In an example implementation as shown in FIG. 1A, the photograph organization module 104 is executing at one location (e.g., a client-side computing device). In an example implementation as shown in FIG. 11, on the other hand, the photograph organization module 104 can be executing in the cloud (e.g., on a network-side computing device), such as if the photographs are stored at or transferred to a server of a remote data center. Alternatively, at least a portion of a photograph organization module 104 may be executing at both a client computing device and a server computing device. In such an implementation, the operations implemented by the photograph organization module 104 as described herein may be distributed across a client-server architecture.

The example computing device 1102 as illustrated includes at least one processing system 1104, one or more computer-readable media 1106, and one or more I/O interfaces 1108 that may be communicatively coupled, one to another. Although not explicitly shown, the computing device 1102 may further include a system bus or other data and command transfer system that couples the various components, one to another. A system bus can include any one or combination of different bus structures, such as a memory bus or memory controller, a peripheral bus, a universal serial bus, or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including one or more hardware elements 1110 that may be implemented as processors, functional blocks, and so forth. This may include implementation in hardware as an application specific integrated circuit (ASIC), a general-purpose processor, or other logic device formed using e.g. one or more semiconductors. The hardware elements 1110 are not limited by the materials from which they are formed or the processing mechanisms employed therein. For example, processors may include or may be realized with semiconductor(s) or transistors (e.g., electronic integrated circuits (ICs)). In such a context, processor-executable instructions may comprise electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (e.g., random access memory (RAM)) or nonvolatile media (e.g., read only memory (ROM), flash memory, optical discs, or magnetic disks). The memory/storage component 1112 may include fixed media (e.g., RAM, ROM, or a fixed hard drive) or removable media (e.g., a flash memory card, a removable hard drive, or an optical disc). The computer-readable media 1106 may be implemented in a variety of other ways as further described below.

The input/output interface(s) 1108 are representative of functionality to allow a user to enter commands or information to computing device 1102 or to allow information to be presented to the user, or other components or devices using various input/output devices. Examples of input devices include a keyboard, a cursor control device (e.g., a mouse or touchpad), a microphone, a scanner, touch functionality (e.g., capacitive, resistive, or other sensors that are implemented to detect physical touch), a camera (e.g., which may employ visible or non-visible wavelengths such as infrared frequencies to recognize movement as gestures that need not involve touch), an accelerometer, or a combination thereof. Examples of output devices include a display device (e.g., an LCD or LED screen, a monitor, or a projector), a speaker, a printer, a network card, a haptic vibrating device, or a combination thereof. Thus, the computing device 1102 may be implemented in a variety of ways as further described below to support local or remote user interaction.

Various techniques may be described herein in the general context of software, hardware elements, or program modules. Generally, such modules may include routines, programs, objects, elements, components, data structures, combinations thereof, and so forth that perform particular tasks or implement particular abstract data types. The terms "module," "functionality," and "component" as used herein generally represent software, firmware, hardware, or a combination thereof. The features of the techniques described herein may be platform-independent, meaning that the described techniques may be implemented on a variety of commercial computing platforms having a variety of processors.

An embodiment of the described modules, and techniques thereof, may be stored on or transmitted across some form of computer-readable media. The computer-readable media 1106 may include a variety of media that may be accessed by the computing device 1102. By way of example, and not limitation, computer-readable media may include "computer-readable storage media" and "computer-readable signal media."

"Computer-readable storage media," as used herein, refers to media or devices that enable persistent and/or non-transitory storage of information in contrast to mere signal transmission, carrier waves, or signals per se. Computer-readable storage media does not include signals per se or signal bearing media. The computer-readable storage media includes hardware such as volatile and non-volatile, removable and non-removable media or storage devices implemented in a process or technology suitable for storage of information, such as computer readable instructions, data structures, program modules, logic elements/circuits, or other data. Examples of computer-readable storage media may include, but are not limited to, RAM, ROM, EEPROM, flash memory, or other e.g. solid state memory technology; CD-ROM, digital versatile discs (DVD), or other optical storage; hard disks, magnetic cassettes, magnetic tape, magnetic disk storage, or other magnetic storage devices; or another storage device, tangible medium, article of manufacture, or combination thereof that is suitable to store desired information and that may be accessed by a computer.

"Computer-readable signal media," as used herein, refers to a signal-bearing medium that is implemented to transmit instructions to hardware of the computing device 1102, such as via a network. Computer-readable signal media typically may embody computer readable instructions, data structures, program modules, or other data in a modulated data signal, such as carrier waves, data signals, or another transport mechanism. Computer-readable signal media may also include any information delivery media. The term "modulated data signal" means a signal that has one or more of its characteristics set or changed in such a manner as to encode information in the signal. By way of example, but not limitation, computer-readable signal media may include wired media, such as a wired network or direct-wired connection, or wireless media, such as acoustic, RF, microwave, infrared, or other wireless media.

As previously described, hardware elements 1110 and computer-readable media 1106 may be representative of modules, programmable device logic, fixed device logic, a combination thereof, and so forth that is implemented in a hardware form that may be employed in some embodiments to implement at least some aspects of the techniques described herein, such as to perform one or more instructions or computing actions. Hardware may include components of an integrated circuit (IC) or on-chip system, an application-specific integrated circuit (ASIC), a field-programmable gate array (FPGA), a complex programmable logic device (CPLD), or other implementations in silicon or other hardware. In this context, hardware may operate as a processing device that performs program tasks defined by instructions or logic embodied by the hardware as well as hardware utilized to store instructions for execution, e.g., the computer-readable storage media described previously.

Combinations of the foregoing may also be employed to implement various techniques described herein. Accordingly, software, hardware, or executable modules may be implemented as one or more instructions or logic embodied on some form of computer-readable storage media or by one or more hardware elements 1110. The computing device 1102 may be configured to implement particular instructions or functions corresponding to software or hardware modules. Accordingly, implementation of a module that is executable by the computing device 1102 as software may be achieved at least partially in hardware, e.g., through use of computer-readable storage media or the hardware elements 1110 of the processing system 1104. The instructions or functions may be executable/operable by one or more articles of manufacture (e.g., one or more computing devices 1102 or processing systems 1104) to implement techniques, modules, or examples described herein.

The techniques described herein may be supported by various configurations of the computing device 1102 and are not limited to the specific aspects of the example devices described herein. This functionality may also be implemented fully or partially through use of a distributed system, such as over a "cloud" 1114 via a platform 1116 as described below.

The cloud 1114 may include or represent a platform 1116 for resources 1118. The platform 1116 abstracts underlying functionality of hardware (e.g., one or more servers or at least one data center) and software resources of the cloud 1114. The resources 1118 may include applications or data that can be utilized while computer processing is at least partially executed on servers that are remote from, or distributed around, the computing device 1102. Resources 1118 may also include services provided over the Internet or through a subscriber network, such as a cellular or Wi-Fi network.

The platform 1116 may abstract resources and functions to connect the computing device 1102 with other computing devices or services. The platform 1116 may also serve to abstract a scaling of resources to provide a corresponding level of scale to encountered demand for the resources 1118 that are implemented via the platform 1116. Accordingly, in an interconnected device embodiment, implementation of functionality described herein may be distributed throughout the illustrated system of FIG. 11, or at least throughout the cloud 1114 along with the computing device 1102. For example, functionality may be implemented in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system implemented at least partially in hardware and operative in a digital medium environment to organize photographs into person-based groups using facial recognition technology and redundant analysis to reduce duplicative groupings, the system comprising:
 a face detection module implemented at least partially in hardware of a computing device to detect faces in multiple photographs;
 a face characterization module implemented at least partially in hardware of the computing device to calculate facial representations of the faces detected in the multiple photographs;
 a face grouping module implemented at least partially in hardware of the computing device to
  perform at least one grouping operation including:
   comparing a detected face to a first group and a second group of the person-based groups, the comparing including:
    calculating a first similarity score of the first group, the first similarity score based on a comparison of the detected face with the first group; and
    calculating a second similarity score of the second group,
   the second similarity score based on a comparison of the detected face with the second group;
   comparing the first similarity score with the second similarity score; and assigning the detected face to the first group based on the comparing and establish a group relationship indicator based on the at least one grouping operation, the group relationship indicator linking the first group to the second group based on a comparison of the second similarity score with a grouping threshold; and a group merging module implemented at least partially in hardware of the computing device to perform at least one merging operation to conditionally merge the first group with the second group based on the group relationship indicator.

2. The system as described in claim 1, further comprising:
a photograph organization module implemented at least partially in hardware of the computing device to cause the multiple photographs to be displayed in accordance with the person-based groups that correspond to persons that are determined to be present in the multiple photographs after the at least one merging operation is performed.

3. The system as described in claim 1, wherein the group merging module is further configured to determine whether to effectuate the merging operation based on at least one merging criterion as part of the at least one merging operation.

4. The system as described in claim 3, wherein the at least one merging criterion comprises a merging threshold relating to similarity scores between facial representations of faces in the first group and facial representations of faces in the second group.

5. The system as described in claim 3, wherein the at least one merging criterion comprises a simpatico threshold relating to a percentage faces in the first group and faces in the second group having similarity scores greater than or equal to a merging threshold.

6. The system as described in claim 4, wherein the merging threshold is not equal to the grouping threshold.

7. In a digital medium environment to organize photographs into person-based groups using facial recognition technology and redundant analysis to reduce duplicative groupings, a method implemented by at least one computing device comprising:
calculating a facial representation of a face in a photograph;
comparing the face to a first group and a second group of the person-based groups, the comparing including:
calculating a first similarity score of the first group, the first similarity score based on a comparison of the facial representation with the first group;
calculating a second similarity score of a second group, the second similarity score based on a comparison of the facial representation with the second group;
comparing the first similarity score and the second similarity score;
assigning the face to the first group based on the comparing;
establishing a group relationship indicator linking the first group to the second group based on a comparison of the second similarity score with a grouping threshold;
computing additional similarity scores based on comparing facial representations of faces in the first group with facial representations of faces in the second group;
merging the first group and the second group to create a merged group based on the computed additional similarity scores.

8. The method as described in claim 7, wherein the merging comprises determining that the computed additional similarity scores comport with a merging threshold.

9. The method as described in claim 8, wherein the merging further comprises determining that the computed similarity scores comport with a simpatico threshold, wherein:
the merging threshold comprises a similarity level;
the simpatico threshold comprises a percentage level; and
the determining comprises determining that at least the percentage level of facial representations of faces in the first group match a facial representation of a face in the second group at the similarity level or higher.

10. The method as described in claim 7, further comprising:
receiving an input that indicates a label for the merged group; and
tagging another photograph that includes a face in the merged group, the tagging based on the label.

11. The method as described in claim 7, further comprising establishing a group relationship indicator linking a third group to the first group.

12. The method as described in claim 7, wherein the merging comprises determining that the computed additional similarity scores comport with a simpatico threshold.

13. The method as described in claim 8, wherein the merging threshold is not equal to the grouping threshold.

14. At least one computing device operative in a digital medium environment to organize photographs into person-based groups and determine if at least two groups of the person-based groups are representative of a single person, the computing device comprising:
a processing system: and
a computer-readable storage-medium having instructions stored thereon that, responsive to execution by the processing system, causes operations to be performed including:
detecting a face in a photograph;
determining similarity scores for respective groups of the person-based groups, the similarity scores based on similarity of the detected face and associated facial representations of the respective groups;
assigning the detected face to a group of the person-based groups, the assigning based on a comparison of the similarity scores;
comparing a grouping threshold with another said similarity score of another group of the person-based groups;
establishing a group relationship indicator based on the comparing, the group relationship indicator indicating that the group and the other group potentially represent a same person; and
merging the group and the other group based at least in part on the group relationship indicator.

15. The computing device as described in claim 14, further comprising organizing the photographic images based on at least one of:
tagging the photographic images based on the merged group; or
displaying the photographic images based on the merged group.

16. The computing device as described in claim 14,
wherein the similarity scores include a similarity score for the group, the similarity score for the group based on similarity of the detected face and an associated facial representation of the group; and wherein the assigning is based in part on:
the similarity score for the group being at or above the grouping threshold; and
the similarity score for the group being stronger than the other said similarity score.

17. The computing device as described in claim 14, wherein the operations further include determining additional similarity scores based on comparing facial representations of faces in the group with at least one facial representation of faces in the other group; and
wherein the merging is based on at least a threshold percentage of the additional similarity scores being at or above a merging threshold.

18. The computing device as described in claim 14, wherein the operations further include determining additional similarity scores based on comparing facial representations of faces in the other group with at least one facial representation of faces in the group; and
wherein the merging is based on at least a threshold percentage of the additional similarity scores being at or above a merging threshold.

19. The method as described in claim 18, wherein the merging threshold is not equal to the grouping threshold.

20. The computing device as described in claim 14, wherein the merging is performed based on comparisons of each face of the first group to at least one face of the second group.

* * * * *